(12) United States Patent
Nakama

(10) Patent No.: US 11,119,429 B2
(45) Date of Patent: Sep. 14, 2021

(54) IMAGE FORMING APPARATUS

(71) Applicant: CANON KABUSHIKI KAISHA, Tokyo (JP)

(72) Inventor: Katsuya Nakama, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 16/829,062

(22) Filed: Mar. 25, 2020

(65) Prior Publication Data

US 2020/0322496 A1 Oct. 8, 2020

(30) Foreign Application Priority Data

Apr. 5, 2019 (JP) .............................. JP2019-072969

(51) Int. Cl.
*G03G 15/00* (2006.01)
*G03G 15/16* (2006.01)
*G03G 21/20* (2006.01)
*H04N 1/00* (2006.01)

(52) U.S. Cl.
CPC ..... *G03G 15/5004* (2013.01); *G03G 15/1695* (2013.01); *G03G 21/20* (2013.01); *G03G 21/203* (2013.01); *G03G 2215/0054* (2013.01); *G03G 2215/00383* (2013.01); *G03G 2215/00413* (2013.01); *G03G 2215/00599* (2013.01); *G03G 2215/00666* (2013.01); *G03G 2215/00772* (2013.01); *G03G 2215/00776* (2013.01); *G03G 2215/1671* (2013.01); *H04N 1/00037* (2013.01); *H04N 1/00082* (2013.01); *H04N 1/00652* (2013.01)

(58) Field of Classification Search
CPC .......... G03G 15/5004; G03G 15/1695; G03G 21/20; G03G 21/203; G03G 2215/00383; G03G 2215/00413; G03G 2215/0054; G03G 2215/00599; G03G 2215/00666; G03G 2215/00772; G03G 2215/00776; G03G 2215/1671; H04N 1/00037; H04N 1/00082; H04N 1/00652
See application file for complete search history.

(56) References Cited

U.S. PATENT DOCUMENTS

| 8,755,734 B2 | 6/2014 | Abe et al. | |
|---|---|---|---|
| 8,948,682 B2 | 2/2015 | Abe et al. | |
| 10,114,327 B2 | 10/2018 | Miyake et al. | |
| 2010/0001454 A1* | 1/2010 | Okumura | B65H 3/60 271/97 |

(Continued)

FOREIGN PATENT DOCUMENTS

| JP | 2001-348131 A | 12/2001 |
|---|---|---|
| JP | 2011-095630 A | 5/2011 |

*Primary Examiner* — Joseph S Wong
(74) *Attorney, Agent, or Firm* — Venable LLP

(57) ABSTRACT

An image forming apparatus includes an image forming unit, a storage portion to which a heating unit configured to heat the sheet stored in the storage portion is detachably attached, a conveyance unit, a detection unit configured to detect attachment of the heating unit to the storage portion, and a control unit configured to control the conveyance unit such that a standby time by which conveyance of the sheet fed from the storage portion is stopped is shorter when the detection unit detects the heating unit than when the detection unit does not detect the heating unit.

11 Claims, 16 Drawing Sheets

(56) References Cited

U.S. PATENT DOCUMENTS

2015/0117925 A1* 4/2015 Fuse ................. G03G 15/2028
399/390
2015/0377944 A1* 12/2015 Fujihara ............. G03G 15/5004
324/613

* cited by examiner

FIG.10

|  | ATTACHEMENT OF CASSETTE HEATERS/ENVIRONMENT HEATER |
|---|---|
| CASSETTE 1 | AVAILABLE |
| CASSETTE 2 | AVAILABLE |

FIG.11A  SHEET LENGTH COEFFICIENT E

| SHEET LENGTH [mm] | COEFFICIENT E |
|---|---|
| ≤ 297.0 | 100 |
| > 297.0 | 150 |

FIG.11B  ABSOLUTE MOISTURE-CONTENT COEFFICIENT F

| ABSOLUTE MOISTURE CONTENT [g/m³] | COEFFICIENT F |
|---|---|
| ≤ 1.5 | 25 |
| ≤ 5.0 | 40 |
| ≤ 10.0 | 55 |
| ≤ 15.0 | 70 |
| ≤ 20.0 | 85 |
| > 20.0 | 100 |

FIG.11C  ENVIRONMENTAL-TEMPERATURE COEFFICIENT G

| ENVIRONMENTAL TEMPERATURE [°C] | COEFFICIENT G |
|---|---|
| ≤ 5 | 150 |
| ≤ 10 | 130 |
| > 10 | 0 |

FIG.11D  PROCESS SPEED COEFFICIENT H

| PROCESS SPEED | COEFFICIENT H |
|---|---|
| 1/1 SPEED | 100 |
| 1/2 SPEED | 50 |

FIG.11E  OFFSET

| OFFSET | 100000000 |
|---|---|

IMAGE FORMING APPARATUS

BACKGROUND OF THE INVENTION

Field of the Invention

The present invention relates to image forming apparatuses such as copying machines, printers, facsimiles, and multifunction printers having a plurality of functions of these products.

Description of the Related Art

An image forming apparatus forms a toner image on a sheet, and fixes the toner image to the sheet by causing a fixing apparatus to heat the toner image. When the sheet is heated, the moisture contained in the sheet evaporates into steam, and water droplets may adhere to a sheet conveyance path. After that, if a sheet is conveyed to the sheet conveyance path, the water droplets may adhere to the sheet, possibly causing a failure in conveyance of sheets and deterioration in image quality. As countermeasures to this, Japanese Patent Application Publication No. 2011-95630 proposes a technique in which a feeding timing at which a sheet is fed to a conveyance path is delayed in accordance with a count value corresponding to the number of sheets on which images have been formed in a single-side image forming operation. This technique allows the sheet to be conveyed after the water droplets on the sheet conveyance path evaporate, and thus can prevent the failure in conveyance of sheets and the deterioration in image quality caused by the adhesion of water droplets.

In addition, Japanese Patent Application Publication No. 2001-348131 discloses an image forming apparatus that includes a heater to heat sheets stored in a cassette. The heater removes moisture of the sheets of the cassette by dehumidifying the sheets, and prevents the steam from generated when the sheets are heated by the fixing apparatus.

However, if the sheet feeding timing is delayed as described in Japanese Patent Application Publication No. 2011-95630, the productivity of the apparatus will be lowered. However, as descried in Japanese Patent Application Publication No. 2001-348131, if the image forming apparatus includes a heater (heating unit) to heat sheets stored in a cassette, water droplets hardly adhere to the sheet conveyance path because the sheets of the cassette are dehumidified. Thus, for preventing the reduction in productivity of the apparatus, the heater of Japanese Patent Application Publication No. 2001-348131 might be attached to the image forming apparatus of Japanese Patent Application Publication No. 2011-95630.

However, the image forming apparatus of Japanese Patent Application Publication No. 2011-95630 would delay the sheet feeding timing in accordance with the count value corresponding to the number of sheets on which images have been formed, regardless of whether the heater is attached to the image forming apparatus. Thus, the productivity of the apparatus would be lowered because the apparatus delays the sheet feeding timing even when the heater is attached to the apparatus.

SUMMARY OF THE INVENTION

An object of the present invention is to provide a configuration that prevents the failure in conveyance of sheets and the deterioration in image quality caused by the adhesion of water droplets to a sheet, while preventing the reduction in productivity of the apparatus.

According to one aspect of the present invention, an image forming apparatus includes an image forming unit configured to form an image on a sheet, a storage portion which is configured to store a sheet, and to which a heating unit configured to heat the sheet stored in the storage portion is detachably attached, a conveyance unit configured to convey the sheet stored in the storage portion to the image forming unit, a detection unit configured to detect attachment of the heating unit to the storage portion, and a control unit configured to control the conveyance unit such that a standby time by which conveyance of the sheet fed from the storage portion is stopped is shorter when the detection unit detects the heating unit than when the detection unit does not detect the heating unit.

Further features of the present invention will become apparent from the following description of exemplary embodiments with reference to the attached drawings.

BRIEF DESCRIPTION OF THE DRAWINGS

FIG. 10 illustrates one example of the cassette-heater attachment setting of the first embodiment.

FIG. 11A is a table illustrating a sheet length coefficient of calculation parameters for a water-droplet removing-time counter C of the first embodiment.

FIG. 11B is a table illustrating an absolute moisture-content coefficient of the calculation parameters for the water-droplet removing-time counter C of the first embodiment.

FIG. 11C is a table illustrating an environmental-temperature coefficient of the calculation parameters for the water-droplet removing-time counter C of the first embodiment.

FIG. 11D is a table illustrating a process speed coefficient of the calculation parameters for the water-droplet removing-time counter C of the first embodiment.

FIG. 11E is a table illustrating an OFFSET of the calculation parameters for the water-droplet removing-time counter C of the first embodiment.

DESCRIPTION OF THE EMBODIMENTS

First Embodiment

Figure 1:
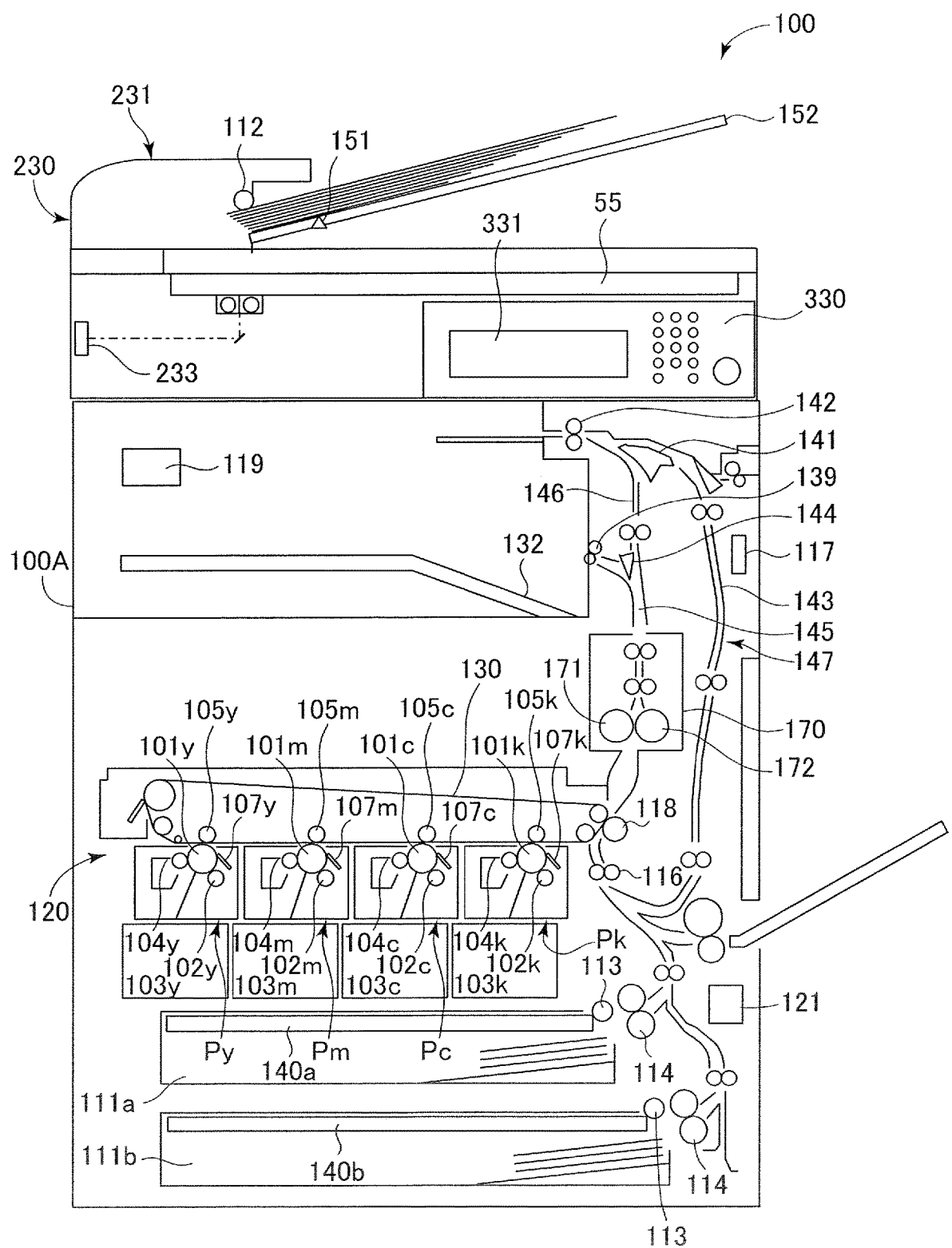
FIG. 1 is a cross-sectional view of a schematic configuration of an image forming apparatus of a first embodiment.

A first embodiment will be described with reference to FIGS. 1 to 11. First, with reference to FIG. 1, a schematic configuration of an image forming apparatus of the present embodiment will be described.

Image Forming Apparatus

An image forming apparatus 100 is a tandem-type intermediate transfer image forming apparatus in which image forming stations Py, Pm, Pc, and Pk for four colors are arranged serially with each other along a rotational direction of an intermediate transfer belt 130. The image forming apparatus 100 forms a full-color image on a sheet (such as a paper sheet or a plastic sheet) by using the electrophotography, in accordance with an image signal sent from an external device such as a computer 283 (FIG. 2) or a document reading apparatus 230.

The document reading apparatus 230 includes an image sensor 233 that reads a document placed on a platen glass 55. On the document reading apparatus 230, an automatic document feeding apparatus 231 is disposed. The automatic document feeding apparatus 231 includes a document sensor 151, a document base 152, and a document conveyance roller 112. The automatic document feeding apparatus 231 causes the document conveyance roller 112 to convey documents (placed on the document base 152), one by one, to an image sensor 233 disposed at a document reading position. The image sensor 233 reads the document conveyed by the automatic document feeding apparatus 231. The document sensor 151 detects a document placed on the document base 152.

For example, when receiving an instruction to start an image forming operation, the image forming apparatus 100 drives the document conveyance roller 112 and conveys a document from the document base 152 onto the platen glass 55, and irradiates the platen glass 55 with light emitted from a lamp (not illustrated). The light reflected from the document is guided to the image sensor 233 by a mirror. The image data of the document read by the image sensor 233 is outputted to an apparatus body 100A of the image forming apparatus 100.

The image forming apparatus 100 performs an image forming operation that forms an image on a sheet, and includes an image forming portion 120 and feeding cassettes 111a and 111b. The image forming portion 120 and the feeding cassettes 111a and 111b are disposed in the apparatus body 100A for forming an image on a sheet. The image forming portion 120, which serves as an image forming unit, includes the plurality of image forming stations Py, Pm, Pc, and Pk, exposure apparatuses 103y, 103m, 103c, and 103k, an intermediate transfer belt 130 serving as an intermediate transfer member, a fixing apparatus 170, and a duplex conveyance path 143. The image forming stations Py, Pm, Pc, and Pk respectively form toner images of yellow (y), magenta (m), cyan (c), and black (k).

The four image forming stations Py, Pm, Pc, and Pk of the image forming apparatus 100 have substantially the same configuration, except that they have different developing colors. Thus, the following description will be made for the image forming station Py as one example. In addition, a component of the other image forming stations identical to a component of the image forming station Py will be omitted, but indicated by a symbol with an index, which symbol is identical to that of the image forming station Py and which index is m, c, or k that replaces the index y.

In the image forming station Py, a cylindrical photosensitive member that serves as an image bearing member, that is, a photosensitive drum 101y is disposed. The photosensitive drum 101y is driven and rotated clockwise in FIG. 1. Around the photosensitive drum 101y, a charging roller 102y serving as a charging apparatus, a development unit 104y serving as a developing apparatus, a primary transfer roller 105y serving as a primary transfer apparatus, and a drum cleaner 107y are disposed, for example. Below the photosensitive drum 101y in FIG. 1, an exposure apparatus (laser scanner) 103y is disposed.

The photosensitive drum 101y, the charging roller 102y, the development unit 104y, and the drum cleaner 107y are disposed in a cartridge, which is detachably attached to the apparatus body 100A. The primary transfer roller 105y changes its position by the action of a solenoid (not illustrated), and switches the state of the intermediate transfer belt 130 and the photosensitive drum 101y, between a contact (abutment) state and a separation state.

The photosensitive drum 101y has an organic photoconductive layer applied and formed on an outer peripheral surface of an aluminum cylinder, and is rotated when driving force from a driving motor (not illustrated) is transmitted to the photosensitive drum 101y. The driving motor rotates the photosensitive drum 101y clockwise in FIG. 1, in accordance with an image forming operation. The charging roller 102y rotates in contact with the photosensitive drum 101y, and uniformly charges the surface of the photosensitive drum 101y. The exposure apparatus 103y irradiates the charged surface of the photosensitive drum 101y with exposing light (laser beam) and selectively exposes the surface of the photosensitive drum 101y, and thereby forms an electrostatic latent image on the surface of the photosensitive drum 101y.

The development unit 104y develops the electrostatic latent image formed on the surface of the photosensitive drum 101y as described above, by using developer. That is, the development unit 104y contains toner that serves as the developer, and includes a developing roller. The developing roller that serves as a developer bearing member is disposed so as to face the photosensitive drum 101y, and rotates while bearing the developer of the development unit 104y. The developing roller uses toner having been conveyed to a portion of the developing roller that faces the photosensitive drum 101y, and develops the electrostatic latent image formed on the photosensitive drum 101y, into a toner image.

When a full-color image is formed, the intermediate transfer belt 130 rotates counterclockwise in contact with the photosensitive drums 101y, 101m, 101c, and 101k. Toner images with respective colors are transferred onto the intermediate transfer belt 130 by primary transfer biases applied to the primary transfer rollers 105*y*, 105*m*, 105*c*, and 105*k*. When a sheet is conveyed while nipped at a position of a secondary transfer roller 118 that serves as a transfer portion, the full-color toner images are simultaneously transferred onto the sheet, with one toner image being superposed on another. Specifically, the secondary transfer roller 118 and the intermediate transfer belt 130 form a nip portion (secondary transfer portion) that nips and conveys a sheet, and the toner images are transferred from the intermediate transfer belt 130 onto the sheet having been conveyed to the secondary transfer portion, by applying a voltage to the secondary transfer roller 118.

When a monochrome image is formed, the intermediate transfer belt 130 rotates counterclockwise in contact with only the photosensitive drum 101*k*, and a toner image is transferred onto the intermediate transfer belt 130 by a primary transfer bias applied to the primary transfer roller 105*k*. As in the full-color image formation, a monochrome toner image is transferred onto a sheet that is nipped and conveyed by the secondary transfer portion. The primary transfer rollers 105*y*, 105*m*, 105*c*, and 105*k* and the secondary transfer roller 118 are rotated by the rotation of the intermediate transfer belt 130.

Sheets are stored in feeding cassettes 111*a* and 111*b*, which serve as storage portions. Each sheet is conveyed from the feeding cassette 111*a* or 111*b* to a registration roller pair 116 through a conveyance path, by a pickup roller 113 and a feed roller 114. The pickup roller 113, which serves as a conveyance unit and a feeding portion, feeds the sheets stored in the feeding cassette 111*a* or 111*b*, toward the image forming portion 120. Specifically, an upper pickup roller 113 serving as a first feeding portion and illustrated in FIG. 1 conveys the sheets from the feeding cassette 111*a* that serves as a first storage portion, to the image forming portion 120. In addition, a lower pickup roller 113 serving as a second feeding portion and illustrated in FIG. 1 conveys the sheets from the feeding cassette 111*b* that serves as a second storage portion, to the image forming portion 120. The sheet is conveyed to the secondary transfer portion by the registration roller pair 116 in synchronization with a timing at which a toner image on the intermediate transfer belt 130 is conveyed to the secondary transfer portion, so that the toner image is transferred from the intermediate transfer belt 130 onto the sheet as described above.

The fixing apparatus 170 that serves as a fixing portion fixes the toner image having been transferred from the intermediate transfer belt 130 to the sheet, to the sheet while conveying the sheet. The fixing apparatus 170 includes a fixing roller 171 that heats the sheet, and a pressure roller 172 that presses the sheet against the fixing roller 171. The fixing roller 171 and the pressure roller 172 are hollow. The fixing roller 171 contains a heater, which is controlled so that the interior of the fixing roller 171 has a temperature suitable for a specified type of the sheet. While the sheet having the toner image is conveyed by the fixing roller 171 and the pressure roller 172, heat and pressure is applied to the sheet, so that the toner image is fixed to a surface of the sheet.

When the image forming apparatus 100 performs a single-side image forming mode in which a toner image is formed on only a single side, the sheet to which the toner image has been fixed passes through a conveyance path 145, and is discharged to a discharging tray 132 by a discharging roller pair 139. With this operation, the image forming operation is completed.

On the other hand, when the image forming apparatus 100 performs a double-side image forming mode in which toner images are formed on both sides of a sheet, the sheet having a toner image on its one side and having passed through the fixing apparatus 170 is conveyed to a reverse-and-conveyance portion 147 for forming another image on a back side of the sheet. The reverse-and-conveyance portion 147 includes a branched conveyance path 146 branched from the conveyance path 145, the reversing roller pair 142, a switching member 141, a duplex conveyance path 143, and rollers of each conveyance path to convey the sheet. The reverse-and-conveyance portion 147 reverses the sheet having passed through the fixing apparatus 170, and conveys the sheet to the secondary transfer roller 118 (secondary transfer portion) again.

In FIG. 1, the fixing apparatus 170 is disposed above the secondary transfer portion, and the discharging roller pair 139 is disposed above the fixing apparatus 170. Thus, the sheet fed from the feeding cassette 111*a* or 111*b* is conveyed upward through the conveyance path, which extends almost vertically. Consequently, the sheet having passed through the fixing apparatus 170 is conveyed to the conveyance path 145, which is disposed above the fixing apparatus 170. When the sheet is to be discharged to the discharging tray 132, the sheet is conveyed from the conveyance path 145 toward the discharging roller pair 139.

On the other hand, when the sheet is to be conveyed to the duplex conveyance path 143, the switching member 144 is switched, and the sheet is conveyed to the reversing roller pair 142 through the branched conveyance path 146, which is disposed above the conveyance path 145. Then, at a timing at which the trailing edge of the sheet passes the switching member 141, the switching member 141 switches and the reversing roller pair 142 rotates in an opposite direction for guiding the sheet to the duplex conveyance path 143. The sheet conveyed to the duplex conveyance path 143 is conveyed to the secondary transfer portion via the registration roller pair 116, with its front side and back side reversed, so that another toner image is transferred onto the back side of the sheet. Operations performed after that are the same as those of the single-side image forming mode.

In the image forming operation (print operation), the temperature of the interior of the image forming apparatus 100 (i.e. temperature of the inside of the apparatus) increases due to heat from the fixing apparatus 170. For this reason, the air of the inside of the apparatus is discharged to the outside (i.e. the outside of the apparatus) by a discharging fan 117 disposed in the vicinity of the fixing apparatus 170. In the present embodiment, the discharging fan 117 is disposed adjacent to the duplex conveyance path 143.

The process speed of a series of image forming operations varies depending on a specified type of sheet. For example, if the operation speed for a thin paper sheet or a plain paper sheet is a 1/1 speed, the operation speed for a thick paper sheet is a ½ speed, and the operation speed for a gloss paper sheet is a ⅓ speed for forming an image.

The image forming apparatus 100 also includes an environment sensor 119 that detects the temperature and humidity of the interior of the apparatus body 100A. The environment sensor 119 detects environment information, such as the temperature and humidity of a place where the image forming apparatus 100 is installed. The detection result from the environment sensor 119 is used to correct high voltages used for forming images and predict a later-described temperature around the development unit.

The image forming apparatus 100 of the present embodiment includes cassette heaters 140*a* and 140*b* that serve as heating units. The cassette heater 140*a* that serves as a first heating unit can be detachably attached to the feeding cassette 111a that serves as the first storage portion to store sheets. The cassette heater 140a can heat sheets of the feeding cassette 111a (first storage portion) in a state where the cassette heater 140a is attached to the feeding cassette 111a. The cassette heater 140b that serves as a second heating unit can be detachably attached to the feeding cassette 111b that serves as the second storage portion to store sheets. The cassette heater 140b can heat sheets of the feeding cassette 111b (second storage portion) in a state where the cassette heater 140b is attached to the feeding cassette 111b. Note that although the feeding cassette 111a is disposed above the feeding cassette 111b in FIG. 1, the feeding cassette 111b may be disposed above the feeding cassette 111a.

In the present embodiment, the cassette heater 140a is disposed above a portion of the feeding cassette 111a in which sheets are stored, and the cassette heater 140b is disposed above a portion of the feeding cassette 111b in which sheets are stored. The cassette heaters 140a and 140b are used to remove moisture of the sheets of the feeding cassettes 111a and 111b.

The image forming apparatus 100 also includes an operation unit 330. The operation unit 330 is disposed on the image forming apparatus 100, and can be operated by an operator for operating the image forming apparatus 100. In the present embodiment, the operation unit 330 is disposed on a front side of the apparatus body 100A, and includes a touch panel 331 that displays various types of information and accepts input operations. The operation unit 330 is one example of user interfaces that accept input operations from an operator via the touch panel 331 or hard keys.

Configuration of Control Unit of Image Forming Apparatus

Figure 2:
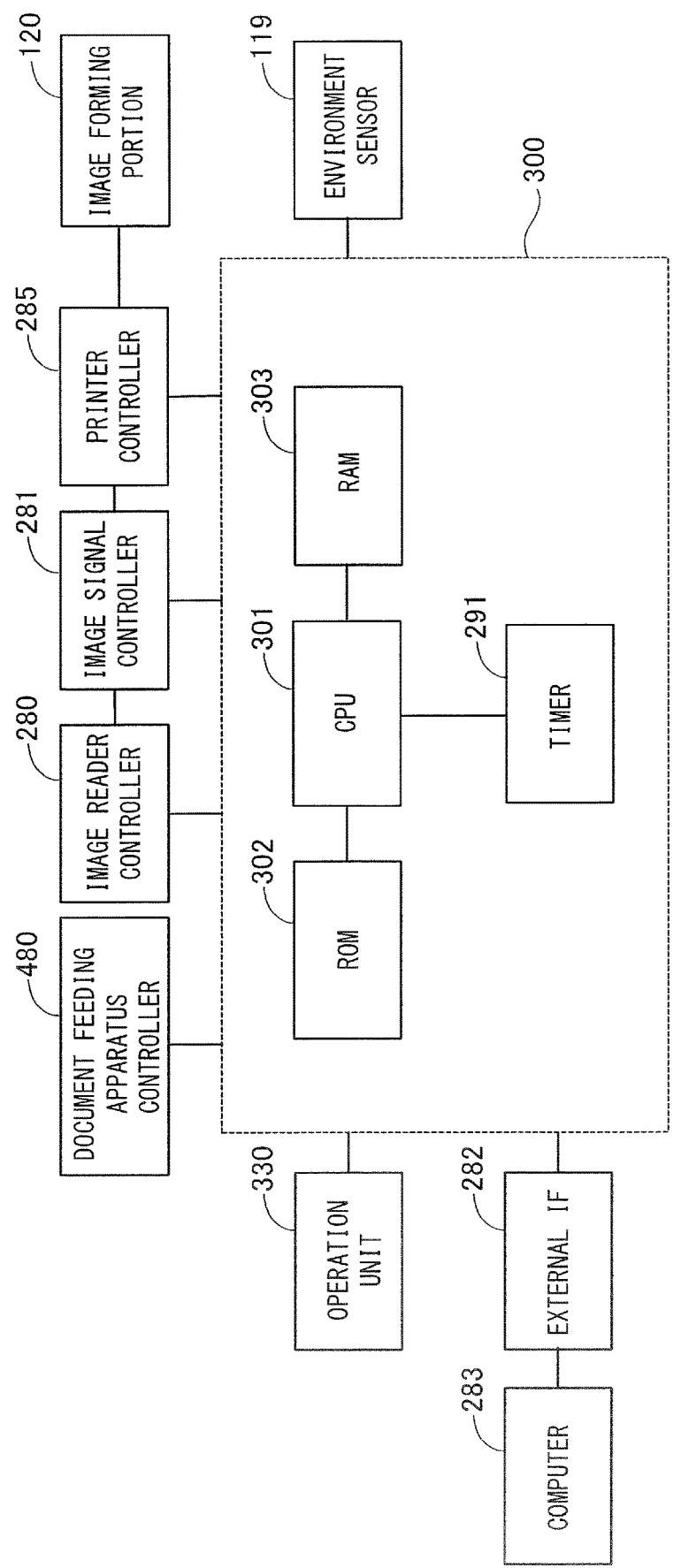
FIG. 2 is a control block diagram of the image forming apparatus of the first embodiment.

Next, a system configuration of the whole of a control unit of the image forming apparatus 100 will be described with reference to a block diagram of FIG. 2. A control unit 300 of FIG. 2 controls the system of the image forming apparatus 100 of FIG. 1, and includes a CPU 301, a ROM 302, a RAM 303, and a timer 291.

The CPU 301 controls the system of the image forming apparatus 100. The CPU 301 is connected with the ROM 302 and the RAM 303 via an address bus and a data bus. The ROM 302 stores a control program, and the RAM 303 stores variables used for the control and image data read by the image sensor 233 of FIG. 1. The CPU 301 is also connected with the timer 291 that measures time. The CPU 301 sets a time count value of the timer 291, and obtains a timer measurement value.

Via a document feeding apparatus controller 480, the CPU 301 drives the document conveyance roller 112, and causes the document sensor 151 to detect a document. In addition, via an image reader controller 280, the CPU 301 detects that a platen cover is opened or closed, and causes the image sensor 233 to read a document placed on a platen glass 55 or fed by the automatic document feeding apparatus 231. An analog image signal outputted from the image sensor 233 is sent to an image signal controller 281.

The image signal controller 281 converts the analog image signal sent from the image sensor 233, to a digital image signal, then processes the digital image signal, then converts the processed digital image signal to a video signal, and then outputs the video signal to a printer controller 285. The image signal controller 281 also processes a digital image signal sent from the computer 283 via the external IF 282, then converts the digital image signal to a video signal, and then outputs the video signal to the printer controller 285.

The printer controller 285 instructs the image forming portion 120 to form an image, depending on an instruction from the CPU 301. For example, depending on an instruction from the CPU 301, the printer controller 285 drives and controls the image forming stations Py, Pm, Pc, and Pk, feeds a sheet, controls the conveyance, and controls the fixing operation performed by the fixing apparatus 170, in accordance with the video signal from the image signal controller 281.

The environment sensor 119 detects the temperature and humidity around the environment sensor 119. The detection value by the environment sensor 119 is read by the CPU 301. The CPU 301 selectively reads temperature data and humidity data at predetermined intervals, and stores the data in the RAM 303.

The operation unit 330 accepts instructions from a user. The instructions are, for example, settings for forming images, including a setting to select single-side printing or double-side printing and a setting to start an image forming operation. The settings received by the operation unit 330 are stored in the RAM 303. In addition, the operation unit 330 causes the touch panel 331 to display a state of the image forming apparatus.

When the CPU 301 receives the setting to select single-side printing or double-side printing from the operation unit 330, and detects that the platen cover is opened or closed, and that a document is placed, via the document feeding apparatus controller 480 and the image reader controller 280, the CPU 301 performs a preparatory operation for forming images. In the preparatory operation for forming images, the CPU 301 instructs the fixing apparatus 170 to start temperature control.

After that, when the CPU 301 receives a start command for an image reading operation, the CPU 301 starts to read a document, via the document feeding apparatus controller 480 and the image reader controller 280. The start command for an image reading operation is sent to the CPU 301 when a user instructs the operation unit 330 to start to read the document. For example, the start command for an image reading operation is sent to the CPU 301 when a copy mode or a transmission mode is selected. The copy mode is a mode to copy an image having been read, to a recording medium; and the transmission mode is a mode to transmit an image having been read, to an external device via the external IF 282 or the like. The image reading operation is continued until the reading of a document placed on the platen glass 55 is completed, or until the reading of the last document detected by the document sensor 151 is completed.

When the copy mode is selected by a user, the CPU 301 instructs, via the printer controller 285, the image forming portion 120 to start an image forming operation on image data stored in the RAM 303. As described above, the image forming portion 120 feeds a sheet stored in the feeding cassette 111a or 111b, and forms an image on the sheet.

Configuration of Cassette Heater

Figure 3:
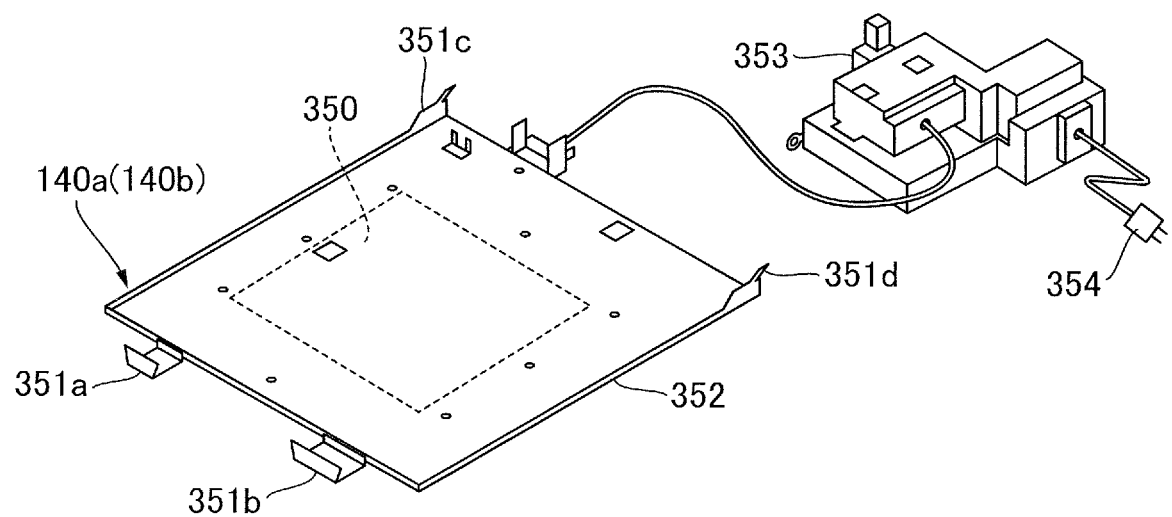
FIG. 3 is a perspective view of a cassette heater of the first embodiment.

Next, a configuration of the cassette heaters 140a and 140b attached to the feeding cassettes 111a and 111b will be described with reference to FIG. 3. In the present embodiment, the cassette heaters 140a and 140b are an identical unit. That is, since any cassette heater having an identical shape can be attached to the feeding cassettes 111a and 111b, the cassette heater 140b can be attached to the feeding cassette 111a, and the cassette heater 140a can be attached to the feeding cassette 111b. If a user has only the cassette heater 140a, the user can attach the cassette heater 140a to any one of the feeding cassettes 111a and 111b. FIG. 3 is a perspective view illustrating a configuration of the cassette heater 140a (140b). The cassette heater 140a (140b) includes a cassette heater plate 352, a cassette heater unit 350 disposed on a bottom portion of the cassette heater plate 352, and a cassette heater power supply unit 353. In addition, cassette heater holders 351a, 351b, 351c, and 351d are formed at edge portions of the cassette heater plate 352.

When the cassette heater 140a (140b) is attached to the feeding cassette 111a (111b), the cassette heater plate 352 is fixed to an upper portion of the feeding cassette 111a (111b) via the cassette heater holders 351a, 351b, 351c, and 351d. The moisture of sheets stored in the feeding cassette 111a (111b) is removed by heat generated by the cassette heater unit 350, which is disposed on the bottom portion of the cassette heater plate 352.

The cassette heater power supply unit 353 supplies electric power to the cassette heater unit 350. In the present embodiment, the cassette heater 140a that serves as a first heating unit is supplied with electric power in a state where the cassette heater 140a is attached to the feeding cassette 111a, separately from the apparatus body 100A (FIG. 1) and the cassette heaters 140b that serves as a second heating unit is supplied with electric power in a state where the cassette heater 140b is attached to the feeding cassette 111b separately from the apparatus body 100A. Specifically, the apparatus body 100A includes a main-body power supply unit 121 (FIG. 1) that serves as a power supply unit and a first power supply unit. The main-body power supply unit 121 has a plug (not illustrated) that can be inserted into an outlet for a commercial power source, and is supplied with electric power from a power source such as the commercial power source. The main-body power supply unit 121 supplies electric power to components of the apparatus body 100A other than the cassette heaters 140a and 140b.

On the other hand, each of cassette heater power supply units 353 for the cassette heaters 140a and 140b that serve as other power supply units or a second power supply unit and a third power supply unit has a plug 354 that can be inserted into an outlet for the commercial power source, and is supplied with electric power from a power source such as the commercial power source, separately from the apparatus body 100A. Thus, a user or a serviceman plugs the plug 354 into the outlet for the power supply when the cassette heater 140a (140b) is used, and unplugs the plug 354 from the outlet when the cassette heater 140a (140b) is not used. Note that the cassette heater power supply unit may be shared by the cassette heater 140a and the cassette heater 140b for supplying electric power to the cassette heaters 140a and 140b. That is, the cassette heater power supply unit that serves as another power supply unit may supply electric power to the cassette heater 140a and the cassette heater 140b.

While the plug 354 is plugged in the outlet, electric power is supplied to the cassette heater unit 350, and the interior of the feeding cassette 111a (111b) is heated by the cassette heater 140a (140b) regardless of whether the main power supply of the image forming apparatus 100 is turned on or off. In addition, even though the cassette heater 140a (140b) is attached to the feeding cassette 111a (111b), the cassette heater 140a (140b) is not electrically connected with the control unit 300 (FIG. 2). Thus, the cassette heater 140a (140b) is not controlled by the CPU 301 of the control unit 300. In addition, if a later-described setting operation is not performed by a user, the CPU 301 cannot detect the attachment of the cassette heater 140a (140b). Note that the cassette heater 140a (140b) has a switch that enables and disables the electric-power supply depending on temperature, for keeping the temperature of the cassette heater unit 350 within a predetermined temperature range.

Attachment Patterns of Cassette Heater

Figure 4C:
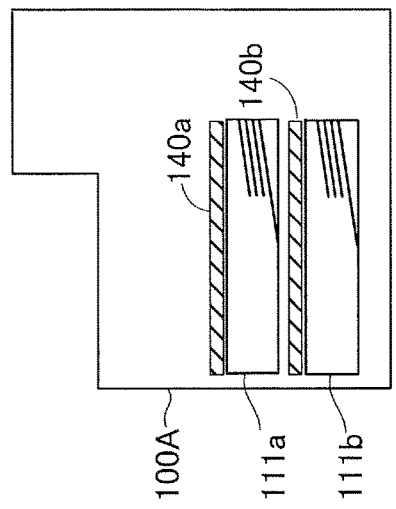
FIG. 4C is a schematic diagram of a third example of attachment of the cassette heater of the first embodiment.
Figure 4B:
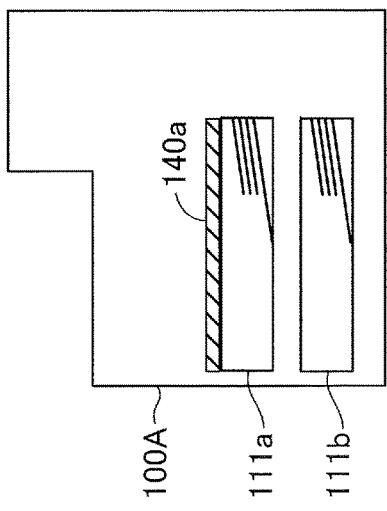
FIG. 4B is a schematic diagram of a second example of attachment of the cassette heater of the first embodiment.
Figure 4A:
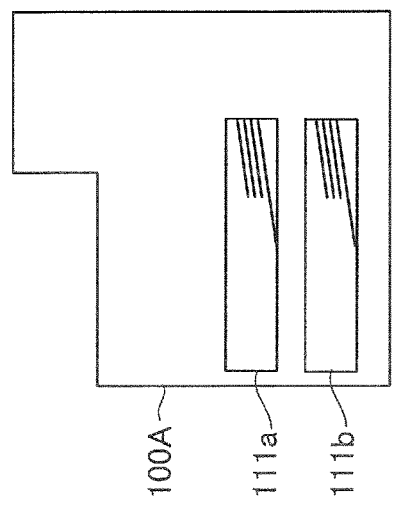
FIG. 4A is a schematic diagram of a first example of attachment of the cassette heater of the first embodiment.

Attachment patterns of the cassette heater 140a (140b) to the apparatus body 100A will be described with reference to FIGS. 4A to 4C. FIG. 4A illustrates a state in which the cassette heater 140a (140b) is not attached to the apparatus body 100A. FIGS. 4B and 4C illustrate states in which a cassette heater is attached to the apparatus body 100A. As illustrated in FIG. 4B, a cassette heater may be attached to any one of the feeding cassettes. As illustrated in FIG. 4C, cassette heaters may be attached to both of the feeding cassettes.

When the same type of sheets is stored in the feeding cassettes 111a and the 111b, the control unit 300 (FIG. 2) may feed the sheets, as described below. Note that the same type of sheets means that the sheets have an identical size or an identical type of material. The control unit 300 performs the below-described control, depending on sheet information that is set by a user via the operation unit 330 or the like (sheets are stored in the feeding cassette 111a (111b)).

When the cassette heater 140a is attached to the feeding cassette 111a, and the cassette heater 140b is not attached to the feeding cassette 111b, the control unit 300 feeds sheets from the feeding cassette 111a to the image forming portion 120. Similarly, when the cassette heater 140b is attached to the feeding cassette 111b, and the cassette heater 140a is not attached to the feeding cassette 111a, the control unit 300 feeds sheets from the feeding cassette 111b to the image forming portion 120. Thus, since the control unit 300 feeds the sheets, with priority, from a feeding cassette to which a cassette heater is attached, water droplets can be prevented from adhering to sheet conveyance paths as described later, even when the interior of the image forming apparatus is under conditions where dew condensation is easily produced. If a user specifies a cassette from which sheets are fed, the specified cassette is used with priority.

When the cassette heaters 140a and 140b are attached to the respective feeding cassettes 111a and 111b, the control unit 300 feeds sheets from one of the feeding cassettes 111a and 111b having a shorter sheet conveyance path extending to the image forming portion 120. In the present embodiment, sheets are fed from the feeding cassette 111a because the feeding cassette 111a is disposed above the feeding cassette 111b in the vertical direction of the image forming apparatus 100 and the feeding cassette 111a has a shorter sheet conveyance path extending to the image forming portion 120. In this case, if the sheets of the feeding cassette 111a have run out, the sheets of the feeding cassette 111b may be supplied. Thus, since the sheets are supplied, with priority, from a feeding cassette having a shorter sheet conveyance path, the sheet conveyance time can be shortened and the productivity of the apparatus can be increased. If a user specifies a cassette from which sheets are fed, the specified cassette is used with priority.

Cassette-Heater Attachment Setting

Next, a method of setting a cassette-heater attachment pattern to the image forming apparatus will be described. In the present embodiment, the setting is performed by using the operation unit 330. That is, the operation unit 330 that serves as a detection unit accepts settings specified by an operator such as a user or a serviceman and indicates whether the cassette heaters 140a and 140b are attached to the feeding cassettes 111a and 111b. In this manner, the operation unit 330 can detect the attachment of the cassette heaters 140a and 140b. The operation unit 330 of the present embodiment includes the touch panel 331, and accepts various settings through the operation performed by a user.

Figure 5A:
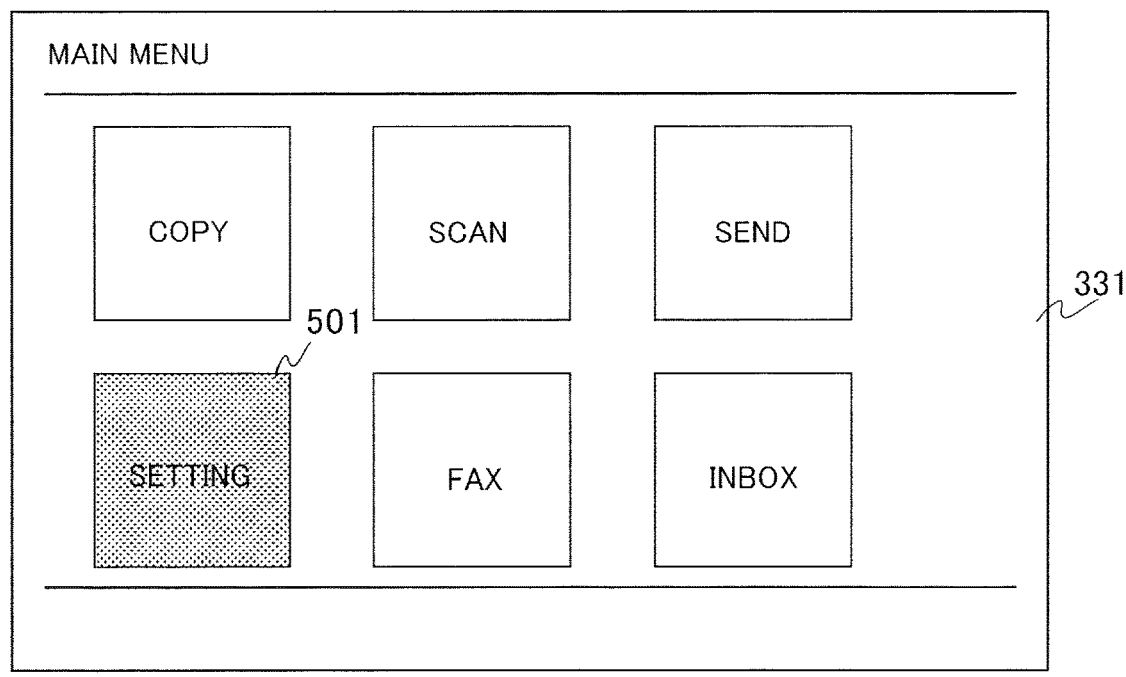
FIG. 5A is a diagram illustrating a display screen of a main menu, displayed on an operation unit of the first embodiment.
Figure 5B:
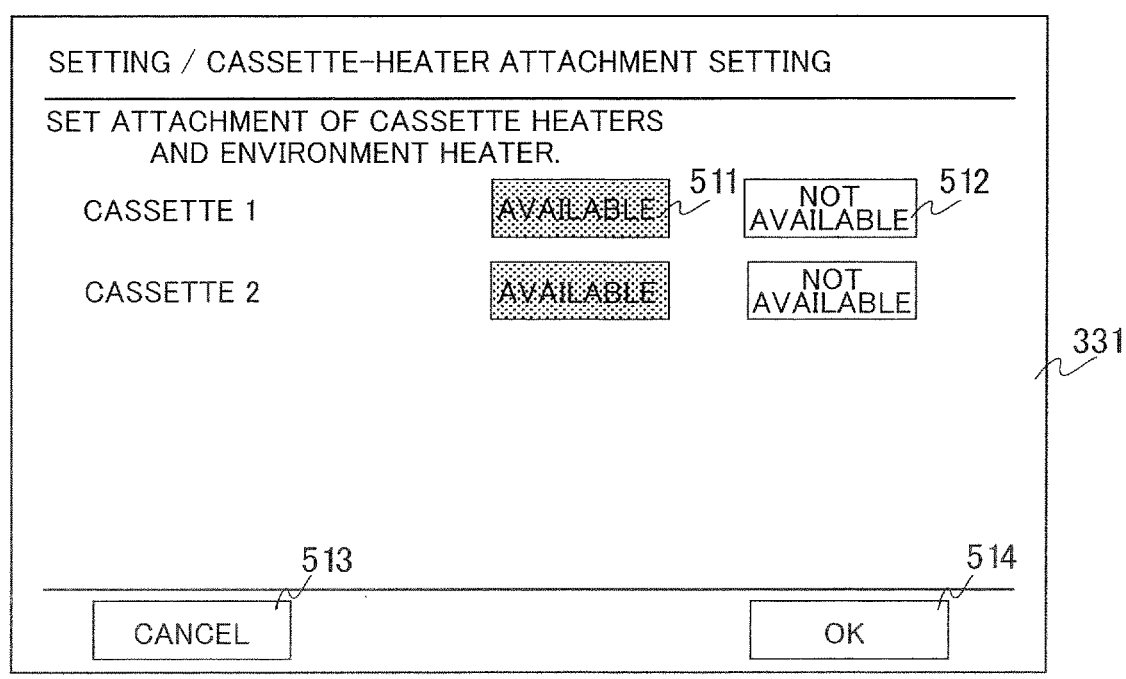
FIG. 5B is a diagram illustrating a display screen of a cassette-heater attachment setting, displayed on the operation unit of the first embodiment.

FIGS. 5A and 5B illustrate examples of display on the touch panel 331 of the operation unit 330. FIG. 5A illustrates an example of display in a standby operation performed before an image forming job is given to the image forming apparatus 100. The image forming job is performed depending on a print signal (image forming signal) for forming an image on a sheet, and involves a period of time from when the image formation is started until when the image formation is completed. That is, the image forming job is performed when the image forming apparatus 100 receives the image forming signal, and involves a period of time in which a series of operations is performed. The series of operations includes a pre-operation (pre-rotation) performed before the image forming operation, the image forming operation, and a post-operation (post-rotation) performed after the image forming operation.

When a setting button 501 illustrated in FIG. 5A is pressed, a cassette-heater attachment setting screen is displayed as illustrated in FIG. 5B. If an operator desires to change setting of attachment of the cassette heaters, the operator changes the setting on this screen. In this case, a cassette 1 of FIG. 5B corresponds to the feeding cassette 111a, and a cassette 2 corresponds to the feeding cassette 111b.

On the setting screen of FIG. 5B, an operator presses a presence button 511 if the cassette heater 140a is attached to the feeding cassette 111a, and presses an absence button 512 if the cassette heater 140a is not attached to the feeding cassette 111a. The same holds true for the attachment of the cassette heater 140b to the feeding cassette 111b. In addition, the operator presses an OK button 514 if the operator accepts the setting, or presses a cancel button 513 if the operator changes the setting. If the OK button 514 is pressed, the setting is stored in the RAM 303 (FIG. 2). The detailed method of changing the setting will be described later.

If not only the cassette heaters 140a and 140b but also other cassette heaters can be attached to the image forming apparatus, the number of selection buttons of FIG. 5B may be increased in the setting of heaters performed via the operation unit 330 illustrated in FIG. 5B. For example, if an environment heater disposed in the lowermost portion of the image forming apparatus (i.e. below the bottom surface of the feeding cassette 111b) and configured to heat or dehumidify the sheets of the cassettes and the interior of the apparatus body can be detachably attached to the image forming apparatus, the setting of attachment of the environment heater may be performed on the display screen of FIG. 5B. In this case, the setting can be performed on the operation unit 330 in the configuration in which electric power is supplied from a power supply separately from the apparatus body, as in the case where electric power is supplied to the cassette heaters 140a and 140b. Thus, the image forming apparatus can perform various types of control, depending on whether the environment heater is attached or not. If the environment heater is not intended to be detachably attached to the image forming apparatus, and is supplied with electric power from the same power supply as that for the apparatus body, a presence button and an absence button for the environment heater may not be displayed on the screen of FIG. 5B.

In FIG. 5B, the presence or absence of the cassette heaters corresponding to the two cassettes can be selected, as one example. However, if the image forming apparatus has more cassettes (e.g. four cassettes) than those of the above-described configuration, the operation unit 330 may cause the touch panel 331 to display the display screen for the cassettes.

As described above, in the present embodiment, since the cassette heaters 140a and 140b have an identical configuration, the cassette heater 140a can be detached from the feeding cassette 111a and attached to the feeding cassette 111b, or the cassette heater 140b can be detached from one feeding cassette in a state where the cassette heater 140a is attached to another feeding cassette. That is, a user can detachably attach a cassette heater to any one of the feeding cassettes.

Thus, even when an attachment position of a cassette heater or the number of attached cassette heaters varies depending on a user, information on the presence or absence of the cassette heater can be inputted via the operation unit. Consequently, the information on the absence or presence of the cassette heater can be easily inputted into the image forming apparatus.

Mechanism that Causes Water Droplets to Adhere to Sheet Conveyance Path

Next, a mechanism that causes water droplets to adhere to the sheet conveyance path will be described with reference to FIG. 1. When a toner image is fixed to a sheet in the fixing apparatus 170, moisture of the sheet is heated and steam is generated. The steam is moved upward by warm air in the apparatus, and adheres to the conveyance path 145, the discharging roller pair 139, the reversing roller pair 142, the branched conveyance path 146, the switching members 141 and 144, and the duplex conveyance path 143 disposed in the vicinity thereof, possibly producing water droplets. In this case, if the double-side image forming mode is performed, the water droplets may adhere to a sheet conveyed to the duplex conveyance path 143. As a result, the sheet may stick to the conveyance path and cause a failure in conveyance of sheets, and a portion of the sheet to which water droplets have adhered may have an image defect such as blur.

The mechanism that causes water droplets to adhere to the sheet conveyance path will be more specifically described. First, a mechanism in the single-side image forming mode will be described. In a case where the single-side image forming mode is performed on a sheet that has absorbed moisture, the sheet is guided to the discharging tray 132 by the switching member 144, after passing through the fixing apparatus 170. In this time, the steam generated when the sheet is heated by the fixing apparatus 170 adheres to the conveyance path 145, the discharging roller pair 139, the reversing roller pair 142, the switching members 141 and 144, and the duplex conveyance path 143 disposed in the vicinity thereof. However, since the steam having adhered to the conveyance path 145, the switching member 144, and the discharging roller pair 139 is discharged to the outside together with the sheet that passes therethrough, water droplets are hardly produced. In contrast, in the single-side image forming mode, the steam continuously adheres to components, such as the branched conveyance path 146, the reversing roller pair 142, the switching member 141, and the duplex conveyance path 143 disposed in the vicinity thereof, which the sheet dose not pass through. Thus, water droplets are easily produced. However, if the single-side image forming mode is continued, the above-described problems hardly occur because a sheet does not pass through the components on which water droplets have been produced.

Next, a mechanism in the double-side image forming mode will be described. In a case where the double-side image forming mode is performed, a sheet is guided to the branched conveyance path 146 and the switching member 141 by the switching member 144, after passing through the fixing apparatus 170. Then the sheet is reversed by the reversing roller pair 142, and guided to the duplex conveyance path 143 by switching the switching member 141. The sheet passes through the secondary transfer portion and the fixing apparatus 170 again, and is guided to the discharging tray 132 by the switching member 144. Also in this case, the steam having adhered to the conveyance path 145, the discharging roller pair 139, the reversing roller pair 142, the switching members 141 and 144, and the duplex conveyance path 143 disposed in the vicinity thereof is removed by a sheet that passes therethrough, and discharged to the outside together with the sheet. Thus, water droplets are hardly produced, and the above-described problems hardly occur.

However, if the single-side image forming mode is performed on a predetermined number of sheets, and then the double-side image forming mode is performed, the above-described problems easily occur. As described above, in the single-side image forming mode, if the steam adheres to the components, such as the branched conveyance path 146, the reversing roller pair 142, the switching member 141, and the duplex conveyance path 143 disposed in the vicinity thereof, and is not removed by a sheet, water droplets are produced when the amount of the steam having adhered to the components exceeds a certain amount. The amount of generated steam is proportional to the number of sheets that pass through the fixing apparatus 170 in the single-side image forming mode. Thus, if images are continuously formed on a plurality of sheets in the single-side image forming mode, water droplets are easily produced. Even in this state, if the double-side image forming mode is not performed, water droplets do not adhere to a sheet. However, if the double-side image forming mode is performed in this state, water droplets will adhere to a sheet, especially to the first sheet in the double-side image forming mode, causing a failure in conveyance of sheets and an image defect. Thus, in the present embodiment, water-droplet removing control as described below is performed for preventing the failure in conveyance of sheets and the image defect caused by the water droplets having adhered to a sheet.

Outline of Water-Droplet Removing Control

First, an outline of water-droplet removing control (dew condensation removing mode) will be described with reference to FIG. 1. The water-droplet removing control is performed to make it difficult for water droplets to adhere to a sheet, by adjusting a standby time by which the conveyance of the sheet from the feeding cassette 111a or 111b to the image forming portion 120 is stopped. In the water-droplet removing control, the feeding of a sheet is stopped until the water droplets of each conveyance path and rollers produced from the steam evaporates. In the present embodiment, since water droplets easily adhere to a sheet when the double-side image forming mode is performed after the single-side image forming mode is performed on a predetermined number of sheets as described above, the above-described standby time is made longer than that in a normal mode when the double-side image forming mode is performed.

The state in which the conveyance of a sheet to the image forming portion 120 is stopped is the state in which the feeding of the sheet from the feeding cassette 111a or 111b by the pickup roller 113 is stopped. Thus, making a standby time longer is delaying a sheet-feeding start timing. The conveyance of a sheet may be temporarily stopped by the feed roller 114, serving as a conveyance portion, after the sheet is picked by the pickup roller 113, as long as the sheet is stopped at a position at which the sheet does not reach the image forming portion 120. In another case, the conveyance of a sheet may be temporarily stopped by another conveyance roller. In this case, if the conveyance of a sheet is stopped at a position upstream from the registration roller pair 116 in the sheet conveyance direction, the sheet can be conveyed to the image forming portion 120 in a state where the skew of the sheet is corrected before the sheet reaches the image forming portion 120, even when the conveyance of the sheet is restarted. Thus, in this case, making a standby time longer is making a conveyance stop time longer by using the feed roller 114 or another conveyance roller. When the conveyance of a sheet is temporarily stopped by the feed roller 114 or another conveyance roller, the feed roller 114 and the other conveyance roller correspond to a first conveyance unit or a second conveyance unit (or a conveyance unit).

Specifically, the sheet feeding operation is stopped before the double-side image forming mode is performed after the single-side image forming mode is continuously performed on a predetermined number of sheets. In addition, the feeding operation for the first sheet is started in the double-side image forming mode after water droplets having adhered to the branched conveyance path 146, the reversing roller pair 142, the switching member 141, and the duplex conveyance path 143 disposed in the vicinity thereof are removed.

As described above, the water-droplet removing control is effectively performed especially when the double-side image forming mode is performed after images are continuously formed in the single-side image forming mode. On the other hand, when not the single-side image forming mode but the double-side image forming mode is performed from the beginning, the steam generated when a sheet on which a toner image is only formed on a first surface (a first side) passes through the fixing apparatus 170 adheres to the reversing roller pair 142 and the duplex conveyance path 143 disposed in the vicinity thereof. In this case, however, the sheet on which a toner image is to be formed on a second surface (a second side) passes through the reversing roller pair 142 and the duplex conveyance path 143 and removes the steam having adhered to the components, before the steam turns into water droplets. Thus, the above-described problems hardly occur even though the water-droplet removing control is not performed.

In the present embodiment, a method of evaporating the water droplets includes a method of increasing the volume of air discharged to the outside of the apparatus by a discharging fan 117 of the image forming apparatus 100, and a method of increasing the temperature of the interior of the apparatus by increasing a target temperature of the fixing apparatus 170. The method reduces the standby time as much as possible, by making the time in which the water droplets evaporate, shorter than the time in natural drying.

Next, the target temperature of the fixing apparatus 170 will be described. As previously described, the fixing apparatus 170 heats a sheet and a toner image formed on the sheet, for fixing the toner image to the sheet. In an image forming job, the printer controller 285 (FIG. 2) performs the control such that the fixing apparatus 170 keeps a temperature of about 180° C. When the image forming job is completed and the image forming apparatus is in a standby state, the printer controller 285 performs the control such that the fixing apparatus 170 keeps a temperature of about 140° C., which is lower than 180° C. When the water-droplet removing control is performed, the printer controller 285 adds 10° C. to the target temperature (180° C.) used in the image forming job of the fixing apparatus 170, and performs the control such that the fixing apparatus 170 keeps a temperature of 190° C. for reducing the time in which the water droplets on the duplex conveyance path 143 evaporate.

Specific Example of Control Flow Including Water-Droplets Removal Control

Next, a specific example of an operation including the water-droplet removing control and performed from when the power supply of the image forming apparatus 100 is turned on until when an image forming job (a print job in this specific example) is completed will be described with reference to FIGS. 6 to 11. In the present embodiment, the standby time of the sheet feeding is adjusted under the water-droplet removing control, depending on whether a cassette heater is attached to the image forming apparatus.

Figure 6:
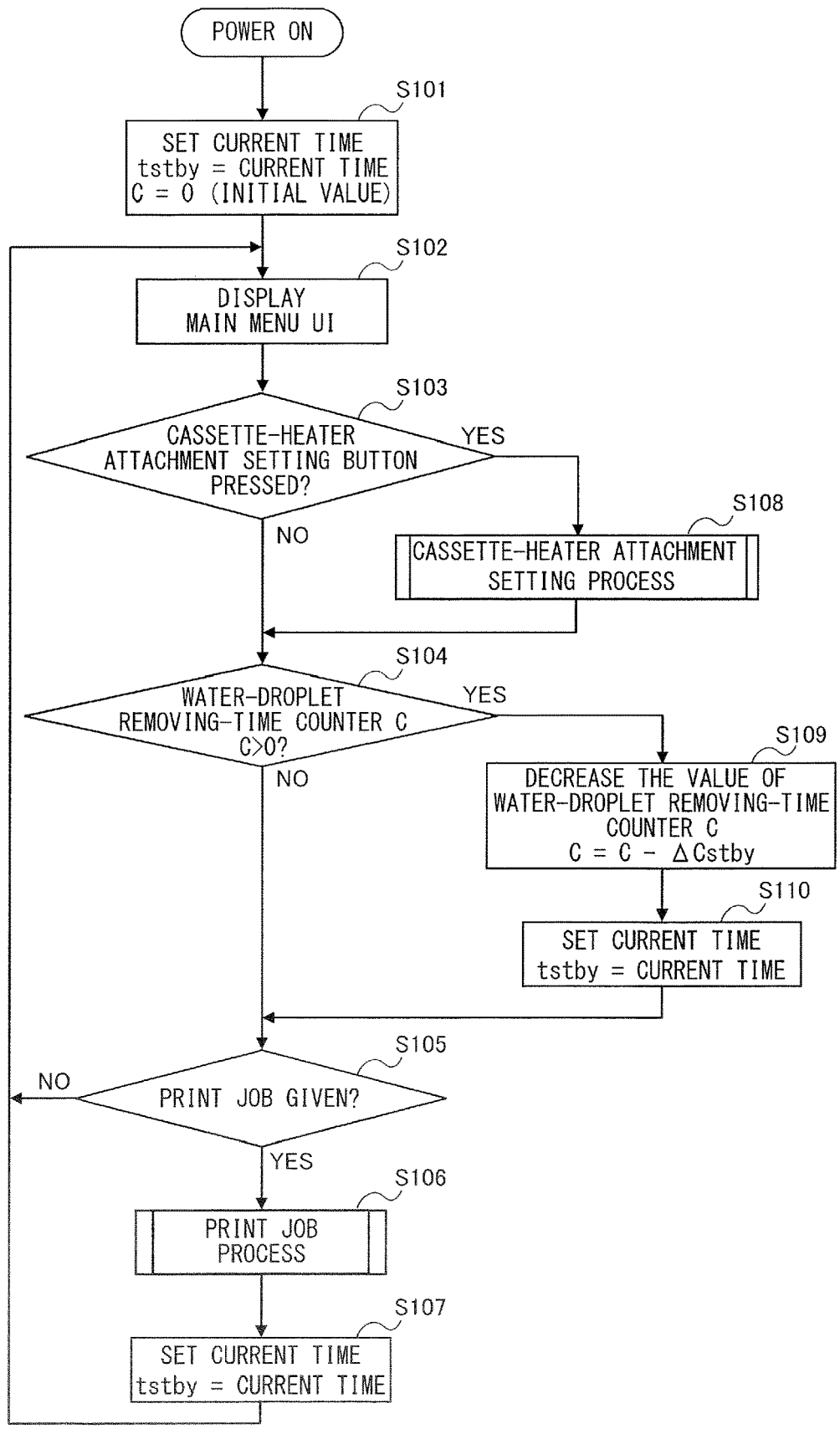
FIG. 6 is a flowchart illustrating a control flow of processes performed from when a power source of the image forming apparatus of the first embodiment is turned on, until when a print job process is performed.

FIG. 6 illustrates a standby operation performed from when the power supply is turned on until when a job is given. When the power supply of the image forming apparatus 100 is turned on, the CPU 301 of the control unit 300 sets a current time to a variable tstby that holds a time used for measuring a natural-drying time obtained in the standby operation (S101). In this time, the CPU 301 set an initial value (0 in the specific example) to a later-described water-droplet removing-time counter C. Then the CPU 301 causes the operation unit 330 to display a main menu screen illustrated in FIG. 5A (S102). This menu screen includes a setting button 501 in addition to function buttons used for performing copy and scan operations. The setting button 501 is used for setting the attachment of each cassette heater to the image forming apparatus 100.

The CPU 301 determines whether the setting button 501 of the screen is pressed in the standby operation (S103). If the setting button 501 is pressed by an operator such as a user (S103: YES), then the CPU 301 executes a later-described cassette-heater attachment setting process (S108). On the other hand, if the setting button 501 is not pressed by an operator (S103: NO), or after the CPU 301 executes the cassette-heater attachment setting process (S108), the CPU 301 determines whether the water-droplet removing-time counter C is larger than 0 (S104).

The water-droplet removing-time counter C indicates an estimated time required for removing water droplets having adhered to the conveyance path 145, the discharging roller pair 139, the reversing roller pair 142, the branched conveyance path 146, the switching members 141 and 144, and the duplex conveyance path 143 disposed in the vicinity thereof. A specific method of calculating the water-droplet removing-time counter C will be described later.

When the value of the water-droplet removing-time counter C is larger than 0 in Step S104 (S104: YES), it means that the steam generated in the fixing apparatus 170 produces water droplets, and that the water-droplet removing control is effective if the double-side image forming mode is performed. Since the water droplets are removed also in the standby operation by natural drying, the water-droplet removing-time counter C is subtracted by using the following equation (S109).

$$C=C-\Delta Cstby$$

The value ΔCstby corresponds to a natural-drying time required in the standby operation, and is calculated by using the following equation.

$$\Delta Cstby=(\text{current time}-tstby)/3$$

The value of the water-droplet removing-time counter C is a numerical value equal to or larger than 0, and is not a negative value. The detailed description on how the water-droplet removing-time counter C is increased will be made later. Then the variable tstby is updated with a current time (S110).

The CPU 301 then checks whether a print job is given (S105). The print job is given when an instruction for performing an image forming operation is sent from a user to the image forming apparatus via the operation unit 330 or the external IF 282. If the print job is given (S105: YES), then the CPU 301 executes a later-described print job process (S106). When completing the print job, the CPU 301 sets a current time to the valuable tstby (S107), and restarts the operations of the flowchart from Step S102. If the print job is not given in Step S105 (S105: NO), then the CPU 301 restarts the operations of the flowchart from Step S102.

Cassette-Heater Attachment Setting Process

Figure 7:
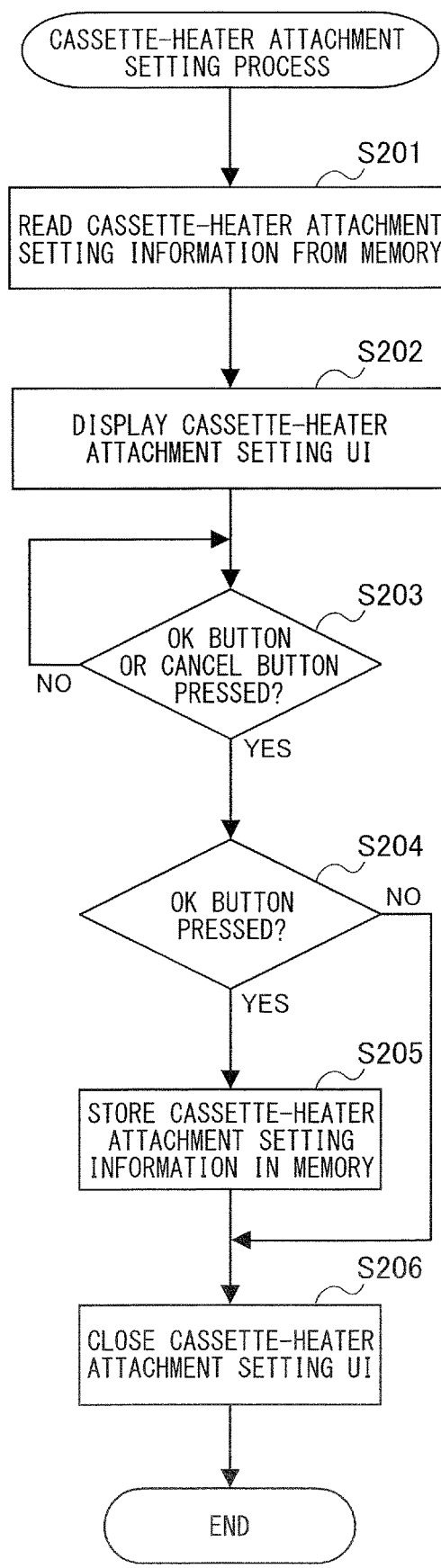
FIG. 7 is a flowchart of a cassette-heater attachment setting process of the first embodiment.

Next, a cassette-heater attachment setting process will be described with reference to the flowchart of FIG. 7. If the cassette-heater attachment setting button 501 is pressed in Step S103 of FIG. 6 (S103: YES), then the CPU 301 reads cassette-heater attachment setting information stored in the RAM 303 (S201). FIG. 10 illustrates an example of data on the cassette-heater attachment setting information stored in the RAM 303. As illustrated in FIG. 10, the data is stored in the RAM 303, as a table containing the number of a feeding cassette and a state of attachment of a cassette heater. In FIG. 10, a cassette 1 corresponds to the feeding cassette 111a, and a cassette 2 corresponds to the feeding cassette 111b.

The CPU 301 uses the data having been read in Step S201, and displays a cassette-heater attachment setting UI (S202). The UI screen displayed in Step S202 contains a current setting state obtained from the information having been read in Step S201. For example, as illustrated in the data example of FIG. 10, if the cassette heater 140a is attached to the cassette 1 and the cassette heater 140b is attached to the cassette 2, a presence button displayed for the cassette 1 is selected for indicating the attachment state of the cassette heater 140a, and a presence button displayed for the cassette 2 is selected for indicating the attachment state of the cassette heater 140b (FIG. 5B). On the other hand, if a cassette heater is not attached to a corresponding cassette, a corresponding absence button is selected.

In addition, an operator can change the cassette-heater attachment setting on this screen. The operator presses the presence button 511 if a cassette heater is attached to a corresponding feeding cassette, or presses an absence button 512 if the cassette heater is not attached to the feeding cassette. The operator presses an OK button 514 on this screen when completing the setting, or presses a cancel button 513 on this screen and closes the screen when canceling the setting.

The CPU 301 waits until the OK button 514 or the cancel button 513 is pressed (S203). If the OK button 514 is pressed (S204: YES), then the CPU 301 stores the cassette-heater attachment setting data in the RAM 303 (S205), closes the cassette-heater attachment setting UI (S206), and opens the main menu screen again. On the other hand, if the cancel button 513 is pressed in Step S204 (S204: NO), then the CPU 301 closes the cassette-heater attachment setting UI (S206), and opens the main menu screen again.

Print Job Process

Figure 8:
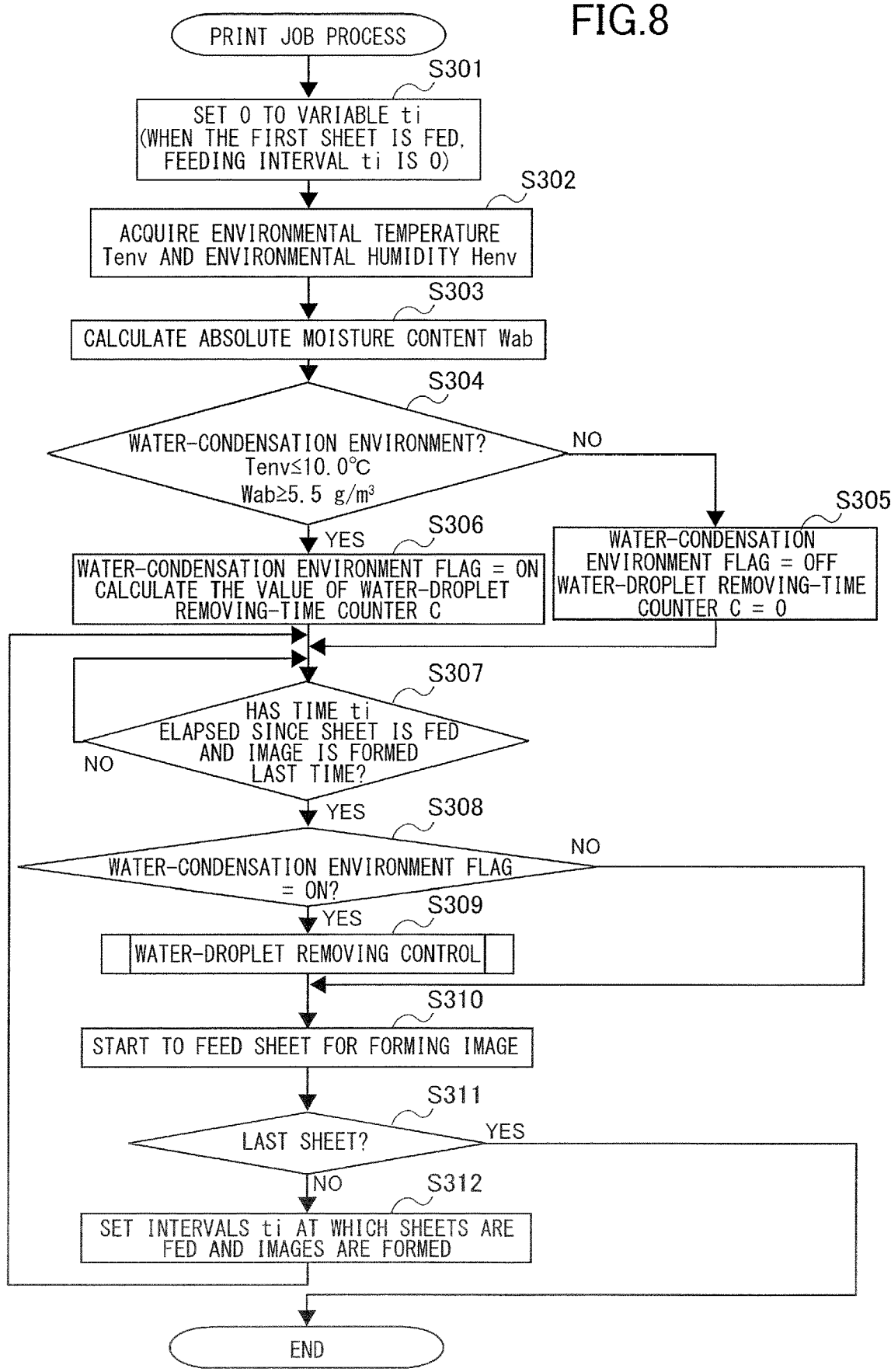
FIG. 8 is a flowchart of the print job process of the first embodiment.

Next, a print job process will be described with reference to the flowchart of FIG. 8. If a print job is given in Step S105 of FIG. 6, the CPU 301 sets 0 to a variable ti that indicates intervals at which sheets are fed and images are formed (S301). The variable ti, which indicates intervals at which sheets are fed and images are formed, is a time interval between a time at which a previous sheet is fed and an image is formed, and a time at which a current sheet is fed and an image is formed. If a print speed of the image forming apparatus 100 of the present embodiment is 60 sheets per minute, the variable ti is 1.0 second because a sheet is fed and an image is formed every 1 second. The CPU 301 sets 0 to the variable ti, which indicates intervals at which sheets are fed and images are formed, because the first sheet is fed when the CPU 301 executes the processes of the flowchart of FIG. 8 for the first time, and because no sheet is fed and no image is formed before the first sheet is fed.

Then the CPU 301 acquires an environmental temperature Tenv and an environmental humidity Henv from the environment sensor 119 (S302). The CPU 301 then calculates an absolute moisture content Wab from a saturated water-vapor density and a relative humidity by using the following equation (S303). The saturated water vapor density is a value based on the environmental temperature Tenv and stored in the ROM 302, and the relative humidity is obtained from the environmental humidity Henv.

absolute moisture content $Wab$ [g/m³]=saturated water-vapor density [g/m³]×relative humidity [%]

The saturated water-vapor density is a value of a table (not illustrated) stored in the ROM 302, and is determined from the environmental temperature.

The CPU 301 determines from the environmental temperature Tenv obtained in Step S302 and the absolute moisture content Wab calculated in Step S303 whether the environment produces water droplets (that is, whether the environment is a dew condensation environment) (S304). If the environmental temperature Tenv obtained in Step S302 is equal to or smaller than 10.0° C. and the absolute moisture content Wab calculated in Step S303 is equal to or larger than 5.5 g/m³, then the CPU 301 determines that the environment produces water droplets.

If the CPU 301 determines that the environment does not produce water droplets (S304: NO), that is, if the detection result by the environment sensor 119 satisfies the predetermined conditions, the CPU 301 sets an off-value to the dew condensation environment flag, and sets 0 to the water-droplet removing-time counter C (S305). The information on on-value and off-value for the dew condensation environment flag is stored in the RAM 303 (FIG. 2). On the other hand, if the CPU 301 determines that the environment produces water droplets (S304: YES), the CPU 301 sets the on-value to the dew condensation environment flag and calculates a value for the water-droplet removing-time counter C (S306). That is, since the environment easily produces water droplets, the CPU 301 calculates an estimated time required to remove the water droplets, from parameters such as the environmental temperature, the environmental humidity, the absolute moisture content, and a length of a sheet in the sheet conveyance direction, by using the following equation. The estimated time is indicated by the water-droplet removing-time counter C.

water-droplet removing-time counter $C$[in units of 10 ms]=water-droplet removing-time counter $C$+(coefficient $D$×coefficient $E$×coefficient $F$×coefficient $G$×coefficient $H$)/OFFSET The coefficient D is a parameter depending on the fixing apparatus, the duplex conveyance path of the image forming apparatus, and a configuration of members used for the duplex conveyance. In the present embodiment, the coefficient D is 120. The coefficient E is a parameter depending on the length of a sheet in the sheet conveyance direction. The coefficient F is a parameter calculated from the absolute moisture content. The coefficient G is a parameter depending on the environmental temperature. The coefficient H is a parameter depending on the image forming speed (process speed). FIGS. 11A to 11E illustrate one example of these coefficients. Note that each of the inequality sign and the inequality sign with equality sign illustrated in FIGS. 11A to 11E indicates a relationship in magnitude between an actual value and a numerical value written on the right side with respect to the inequality sign or the like. For example, in FIG. 11A, "≤297.0" means that the length of the sheet is equal to or smaller than 297.0 mm, and ">297.0" means that the length of the sheet is larger than 297.0 mm. The image forming speed is determined depending on the grammage of sheets that pass through the fixing apparatus. For example, if thick paper sheets with a grammage of 120 g/m² or more are fed, image are formed at an image forming speed (½ speed) that is half the image forming speed for thin paper sheets and plain paper sheets with a grammage of less than 120 g/m².

This calculation is performed when the single-side image forming mode is performed on sheets, and the water-droplet removing-time counter C is increased as long as the single-side image forming mode is continued. However, the water-droplet removing-time counter C has an upper limit, which is 90,000 ms in the present embodiment. The upper limit is the maximum amount of time required to remove the water droplets in the environment where the image forming apparatus 100 is used, and depends on a configuration of the image forming apparatus 100.

Then the CPU 301 checks whether the elapsed time since a previous sheet is fed and an image is formed on the sheet is equal to or larger than the value of the variable ti (S307). Note that if the double-side image forming mode is performed, then the CPU 301 waits until images are formed on both sides (a first side and a second side) of a sheet. If the elapsed time is smaller than the value of the variable ti (S307: NO), then the CPU 301 repeats Step S307 until the elapsed time is equal to or larger than the value of the variable ti. On the other hand, if the elapsed time is equal to or larger than the value of the variable ti (S307: YES), then the CPU 301 determines whether the dew condensation environment flag has the on-value (S308).

If the CPU 301 determines in Step S308 that the dew condensation environment flag has the off-value, or determines that the environment does not produce water droplets (S308: NO), the CPU 301 starts to feed a sheet and form an image on the sheet (S310). That is, if the detection result by the environment sensor 119 satisfies the predetermined conditions, the CPU 301 performs a normal mode in which sheets are fed and images are formed on the sheets at the normal intervals ti. In this case, the standby time is equal to the feeding interval ti. If a sheet fed in Step S310 for forming an image on the sheet is the last sheet in the print job (S311: YES), then the CPU 301 ends the print job. If the sheet fed in Step S310 for forming an image on the sheet is not the last sheet in the print job (S311: NO), then the CPU 301 sets the feeding interval ti for the next sheet (S312) and executes the processes of the flowchart from Step S307. In the present embodiment, since the image forming apparatus 100 forms images on 60 sheets per minute, the CPU 301 sets 1.0 second to the variable ti.

If the CPU 301 determines in Step S308 that the dew condensation environment flag has the on-value, or determines that the environment produces water droplets (S308: YES), then the CPU 301 performs a later-described water-droplet removing control (S309), and starts to feed a sheet and form an image on the sheet after completing the water-droplet removing control (S310).

Water-Droplet Removing Control

Next, the water-droplet removing control will be described with reference to the flowchart of FIG. 9. If the dew condensation environment flag has the on-value in Step S308 of FIG. 8 (S308: YES), then the CPU 301 sets a current time to a variable tprint, which is used to measure a natural-drying time taken in the print job (S401). Then the CPU 301 determines whether the double-side image forming mode is being performed (S402). That is, the CPU 301 determines whether an image is to be formed on a sheet, in the single-side image forming mode, to be fed to the image forming portion, or whether an image is to be formed on the first side of a sheet in the double-side image forming mode.

If the CPU 301 determines in Step S402 that an image is not to be formed on a sheet in the double-side image forming mode, that is, an image is to be formed on a sheet in the single-side image forming mode (S402: NO), then the CPU 301 reads the attachment setting information on the cassette heaters 140a and 140b, from the RAM 303 (S403). Then the CPU 301 determines whether to feed a sheet from a feeding cassette to which a cassette heater is attached (S404). When the sheet is fed from the feeding cassette to which the cassette heater is attached (S404: YES), the amount of steam generated in the fixing apparatus 170 does not cause water droplets because the sheet fed from the feeding cassette does not have moisture. Thus, the CPU 301 sets 0 to the water-droplet removing-time counter C (C=0) (S405).

On the other hand, when a sheet is fed from a feeding cassette to which a cassette heater is not attached (S404: NO), the sheet may have moisture and cause steam in the fixing apparatus 170. However, since some of the water droplets evaporate in natural drying, the water-droplet removing-time counter C is decreased through the following equation (S406).

$$C = C - \Delta Cprint$$

The value $\Delta Cprint$ corresponds to a time taken in the natural drying in the print job, and is calculated by using the following equation.

$$\Delta Cprint = (current\ time - tprint)/2$$

Then the CPU 301 sets a current time to the variable tprint (S407).

Note that while the above-described $\Delta Cstby$ is obtained by calculating (current time−tstby)/3, the value $\Delta Cprint$ is obtained by calculating (current time−tprint)/2. This is because the temperature of the interior of the image forming apparatus 100 (that is, the inside of the apparatus) in the print job is higher than that in the standby mode. Since the water droplets easily evaporate when the temperature of the inside of the apparatus increases, the value $\Delta Cprint$ used for the subtraction is made larger than the value $\Delta Cstby$. That is, if the value of (current time−tstby) is equal to the value of (current time−tprint), the value will become larger when divided by a smaller value. As a result, the value $\Delta Cprint$ subtracted from the water-droplet removing-time counter C (C=C−$\Delta Cprint$) becomes larger.

If the CPU 301 determines in Step S402 that an image is to be formed on a sheet in the double-side image forming mode (S402: YES), then the CPU 301 determines whether the value of the water-droplet removing-time counter C is equal to or larger than a predetermined threshold C0 (S408). For example, the threshold C0 is 1 second. When the value of the water-droplet removing-time counter C is equal to or larger than the threshold C0 in Step S408 (S408: YES), water droplets highly likely have adhered to the duplex conveyance path 143. For this reason, the CPU 301 drives the discharging fan 117, which rotates at half speed in a normal print job, so as to rotate at full speed (S409). Consequently, the amount of air from the discharging fan 117 is increased, compared to the amount of air discharged when the water-droplet removing-time counter C is less than the threshold C0.

In addition, for increasing the temperature of the interior of the apparatus, the CPU 301 increases the target temperature of the fixing apparatus 170 by 10° C. with respect to the target temperature of the fixing apparatus 170 used when images are formed (S410). Then the CPU 301 continues to perform the processes S409 and S410 for a period of time indicated by the water-droplet removing-time counter C (in units of 10 ms) (S411), and clears the water-droplet removing-time counter C (C=0) (S412) and returns to Step S408.

If the value of the water-droplet removing-time counter C is smaller than the threshold C0 in Step S408 (S408: NO), then the CPU 301 drives the discharging fan 117 so as to rotate at the normal half speed again (S413). In addition, the CPU 301 decreases the target temperature of the fixing apparatus 170 by 10° C. so that the fixing apparatus 170 has the original target temperature (S414), sets a current time to the variable tprint used to measure the natural-drying time taken in the print job (S415), and ends the water-droplet removing control.

As described above, in the present embodiment, the image forming apparatus 100 includes the operation unit 330. The attachment information on the cassette heaters 140a and 140b to the feeding cassettes 111a and 111b are input into the operation unit 330 by an operator. Thus, even though a mechanism to detect the attachment of the cassette heaters is not provided, the attachment of the cassette heaters can be detected with a simple configuration. Thus, in the present embodiment, the cassette heaters 140a and 140b can be electrically separated from the control unit 300, even in the configuration in which electric power is supplied to the cassette heaters 140a and 140b separately from the apparatus body 100A. For example, the configuration may not have signal lines connecting the cassette heaters and the control unit. In addition, the configuration may not have a mechanism, such as a switch, that detects the attachment of the cassette heaters. As a result, the attachment of the cassette heaters can be detected with the simple configuration. In the present embodiment, since the cassette heaters 140a and 140b are not supplied with electric power from the apparatus body 100A, it is unnecessary to provide a circuit in the apparatus body 100A for supplying electric power to the cassette heaters 140a and 140b. Thus, the costs for the apparatus can be reduced.

The control unit 300 can perform a dew condensation removing mode when causing the image forming portion 120 to form an image on a sheet. In the dew condensation removing mode, the control unit 300 adjusts the standby time in which the feeding of a sheet from one of the feeding cassettes 111a and 111b that feeds the sheet to the image forming portion 120 is stopped. In the present embodiment, the water-droplet removing control corresponds to the dew condensation removing mode. As described above, the standby time in the dew condensation removing mode is longer than that in the normal mode. In addition, the standby time in the water-droplet removing control performed when one of the cassette heaters 140a and 140b is attached to a corresponding sheet feeding cassette is made shorter than the standby time in the water-droplet removing control performed when the cassette heater is not attached to the feeding cassette.

In particular, in the present embodiment, the control unit 300 performs the water-droplet removing control in a case where the double-side image forming mode in which toner images are formed on both sides of a sheet is performed after the single-side image forming mode in which a toner image is formed. In addition, the standby time by which the feeding of the sheet, e.g. the first sheet, for forming an image on a first side of the first sheet is stopped in the water-droplet removing control performed when a cassette heater is attached to a corresponding sheet feeding cassette is made shorter than the standby time in the water-droplet removing control performed when the cassette heater is not attached to the feeding cassette. That is, for reducing the standby time, if the cassette heater is attached to the feeding cassette, the control unit 300 makes a start time of the sheet feeding performed by the pickup roller 113, earlier than a start time of the sheet feeding performed when the cassette heater is not attached to the feeding cassette. In a case where the standby time is adjusted by temporarily stopping the conveyance by the feed roller 114 and other conveyance rollers disposed downstream from the pickup roller 113, the control unit performs the control as follows. That is, for reducing the standby time, if the cassette heater is attached to the feeding cassette, the control unit 300 makes a period of time, from when the pickup roller 113 starts to feed a sheet until when the feed roller 114 and other rollers temporarily stop the feeding of the sheet, shorter than a period of time of the sheet feeding performed when the cassette heater is not attached to the feeding cassette.

Figure 9:
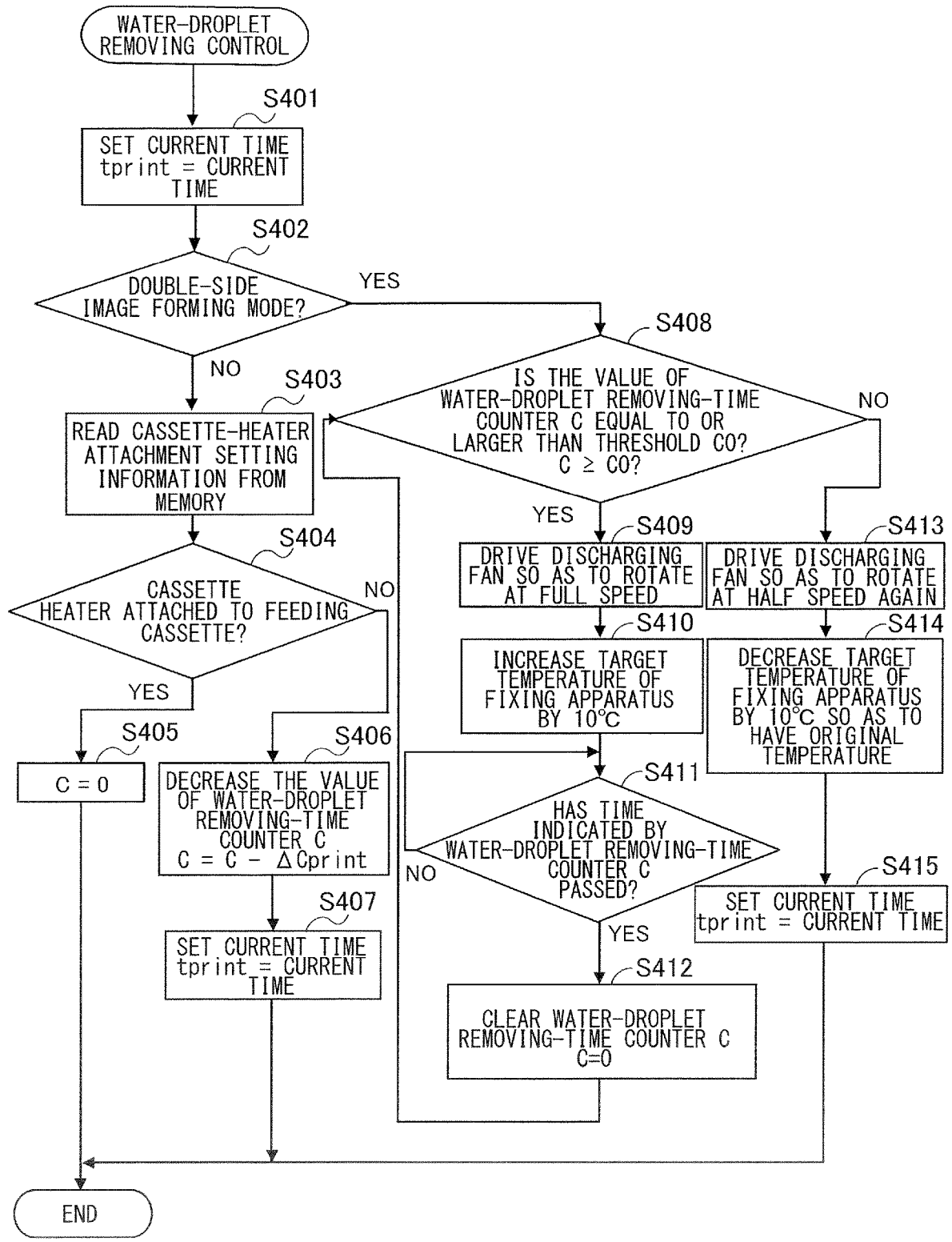
FIG. 9 is a flowchart of a water-droplet removing control of the first embodiment.

Specifically, if a cassette heater is attached to a sheet feeding cassette in Step S404 of FIG. 9 (S404: YES), then the value of the water-droplet removing-time counter C is 0 in Step S408, and is smaller than the threshold C0 in Step S408 (S408: NO). Thus, the CPU 301 proceeds to Step S413, and the feeding of the sheet is started after the normal standby time ti has elapsed (see S307 to S310 of FIG. 8).

On the other hand, when a cassette heater is not attached to a sheet feeding cassette in Step S404 of FIG. 9 (S404: NO), the value of the water-droplet removing-time counter C may become equal to or larger than the threshold C0 in Step S408, even though the water-droplet removing-time counter C is decreased in Step S406. When the value of the water-droplet removing-time counter C is equal to or larger than the threshold C0 (S408: YES), the value of the water-droplet removing-time counter C is added to the normal standby time ti in S411, so that the standby time becomes longer than the standby time required when the cassette heater is attached to the feeding cassette. Thus, since the water droplets having adhered to the branched conveyance path 146, the reversing roller pair 142, the switching member 141, and the duplex conveyance path 143 disposed in the vicinity thereof evaporate, the water droplets can be prevented from adhering to a sheet that has been sent to the reverse-and-conveyance portion 147 in the double-side image forming mode, and from causing the failure in conveyance of sheets and image defects.

Thus, in the present embodiment, when a cassette heater is attached to a corresponding sheet feeding cassette, the standby time by which the feeding of a sheet is stopped is made shorter. This operation can prevent reduction in productivity. On the other hand, when a cassette heater is not attached to a corresponding sheet feeding cassette, the standby time by which the feeding of a sheet is stopped is made longer because the water droplets easily adhere to the duplex conveyance path 143 and the like. Thus, since a sheet is conveyed after most of the water droplets on the duplex conveyance path 143 and the like evaporate, the water droplets having adhered to the duplex conveyance path 143 and the like can be prevented from causing the failure in conveyance of sheets and image defects (deterioration in image quality).

In addition, in a state where the feeding of a sheet is stopped in the water-droplet removing control, the control unit 300 makes the amount of air from the discharging fan 117, less when a cassette heater is attached to a feeding cassette, than when the cassette heater is not attached to the feeding cassette. That is, if a cassette heater is not attached to a feeding cassette in Step S404, the value of the water-droplet removing-time counter C may be equal to or larger than the threshold C0. As a result, the CPU 301 proceeds to Step S409, and increases the amount of air from the discharging fan 117. On the other hand, if a cassette heater is attached to a sheet feeding cassette in Step S404, the value of the water-droplet removing-time counter C is 0 in Step S405, and is smaller than the threshold C0 in Step S408. Then the CPU 301 proceeds to Step S413, and changes the amount of air from the discharging fan 117, to the original amount of air. As described above, water droplets having adhered to the branched conveyance path 146, the reversing roller pair 142, the switching member 141, and the duplex conveyance path 143 disposed in the vicinity thereof are facilitated to evaporate, and the standby time for feeding a sheet can be reduced.

In addition, in a state where the feeding of a sheet is stopped in the water-droplet removing control, the control unit 300 makes the set temperature (target temperature) of the fixing apparatus 170, lower when a cassette heater is attached to a sheet feeding cassette, than when the cassette heater is not attached to the feeding cassette. That is, if a cassette heater is not attached to a feeding cassette in Step S404, the value of the water-droplet removing-time counter C may be equal to or larger than the threshold C0 in Step S408. As a result, the CPU 301 proceeds to Step S410, and increases the target temperature of the fixing apparatus 170. On the other hand, if a cassette heater is attached to a sheet feeding cassette in Step S404, the value of the water-droplet removing-time counter C is 0 in Step S405, and is smaller than the threshold C0 in Step S408. Then the CPU 301 proceeds to Step S414 and changes the target temperature of the fixing apparatus 170 to the original target temperature. Also with this operation, water droplets having adhered to the branched conveyance path 146, the reversing roller pair 142, the switching member 141, and the duplex conveyance path 143 disposed in the vicinity thereof are facilitated to evaporate, and the standby time for feeding a sheet can be reduced.

Thus, in the present embodiment, when a cassette heater is attached to a sheet feeding cassette, the amount of air from the discharging fan 117 and the set temperature of the fixing apparatus 170 are decreased. By the way, if the amount of air from the discharging fan 117 and the set temperature of the fixing apparatus 170 are increased, a service life of each component will be reduced. Thus, in the present embodiment, when a cassette heater is attached to a sheet feeding cassette, reduction in service life of each component can be suppressed by decreasing the amount of air from the discharging fan 117 and the set temperature of the fixing apparatus 170.

Note that in the present embodiment, when the detection result by the environment sensor 119 satisfies the predetermined conditions, the control unit 300 does not perform the water-droplet removing control regardless of the attachment of the cassette heater 140*a* or 140*b*. That is, the predetermined conditions are satisfied when the environmental temperature Tenv is larger than 10.0° C. and the absolute moisture content Wab is smaller than 5.5 g/m³ in Step S304 of FIG. 8. In this case, the control unit 300 does not perform the water-droplet removing control (S305, and S308: NO). In other words, if the environmental temperature Tenv is larger than 10.0° C. and the absolute moisture content Wab is smaller than 5.5 g/m³, the control unit 300 does not perform the water-droplet removing control because the environment hardly produces water droplets. This operation can prevent the water-droplet removing control from being excessively performed, and the productivity of the apparatus from being lowered.

As described above, in the present embodiment, the attachment of a cassette heater is detected by setting the attachment of the cassette heater by using the operation unit 330, and the water-droplet removing control is optimized in accordance with whether the cassette heater is attached to a corresponding feeding cassette. With this operation, the reduction in productivity of the apparatus is suppressed, and an inexpensive apparatus that hardly causes the failure in conveyance and image defects can be provided.

Second Embodiment

Next, a second embodiment will be described with reference to FIGS. 1 and 2, and FIGS. 12 to 14. In the above-described first embodiment, the cassette heater attachment setting is performed on the operation unit 330 disposed on the image forming apparatus 100. In the present embodiment, the cassette heater attachment setting is performed by using the computer 283 connected to the image forming apparatus 100. Since the other configuration and operations are the same as those of the first embodiment, a component identical to a component of the first embodiment is given an identical symbol, duplicated description and illustration will be omitted or simplified, and features different from the first embodiment will be mainly described below.

In the present embodiment, the cassette heater attachment setting is performed by using the computer 282 (FIG. 2) connected to the image forming apparatus 100. Specifically, an external device such as the computer 283 is connected to the image forming apparatus 100 via the external IF 282, and the image forming apparatus 100 can accept a variety of settings through the operation of the computer 283. That is, the image forming apparatus 100 includes the external IF 282 that serves as the detection unit, and the external IF 282 is a connection portion that can be connected with the computer 283 for inputting information into the image forming apparatus 100 from the computer 283, which serves as an external terminal. Since the information on attachment of the cassette heaters 140*a* and 140*b* to the feeding cassettes 111*a* and 111*b* is inputted by an operator via the external terminal, the external IF 282 can detect the attachment of the cassette heaters 140*a* and 140*b*.

Figure 12:
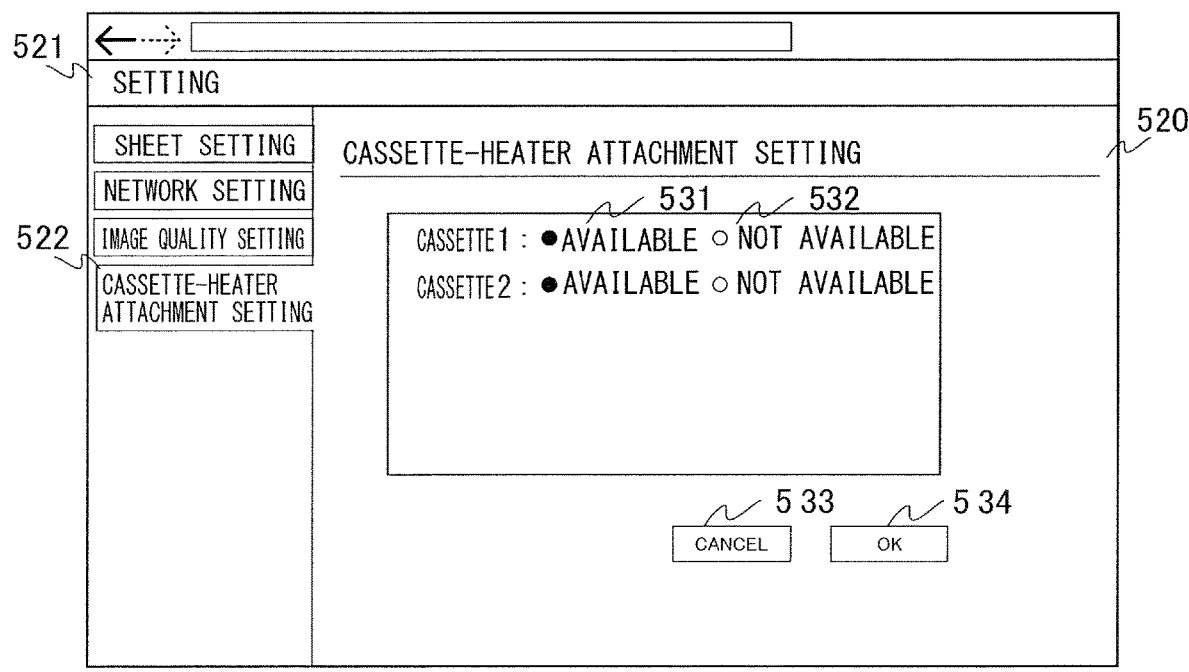
FIG. 12 is a diagram illustrating a display screen of cassette-heater attachment setting of a second embodiment, displayed on a computer.

FIG. 12 illustrates an example of a display screen 520 displayed on a display of the computer 283. In FIG. 12, if a cassette-heater attachment setting button 522 is pressed on a setting screen 521, a cassette-heater attachment setting screen is displayed. In this case, a cassette 1 of FIG. 12 corresponds to the feeding cassette 111*a*, and a cassette 2 corresponds to the feeding cassette 111*b*. If the cassette heater 140*a* is attached to the feeding cassette 111*a*, an operator presses a presence button 531 illustrated in FIG. 12.

On the other hand, if the cassette heater 140*a* is not attached to the feeding cassette 111*a*, the operator presses an absence button 532 illustrated in FIG. 12. The same holds true for the attachment of the cassette heater 140*b* to the feeding cassette 111*b*. In addition, the operator presses an OK button 534 if the operator accepts the setting, or presses a cancel button 533 if the operator changes the setting. If the OK button 534 is pressed, the setting is sent to the control unit 300 via the external IF 282.

Next, a specific example of operations including the water-droplet removing control and performed from when the power supply of the image forming apparatus 100 is turned on until when an image forming job (a print job in this specific example) is completed will be described with reference to FIGS. 13 and 14. The print job process and the water-droplet removing control are the same as those illustrated in the flowcharts of FIGS. 8 and 9 of the first embodiment.

Figure 13:
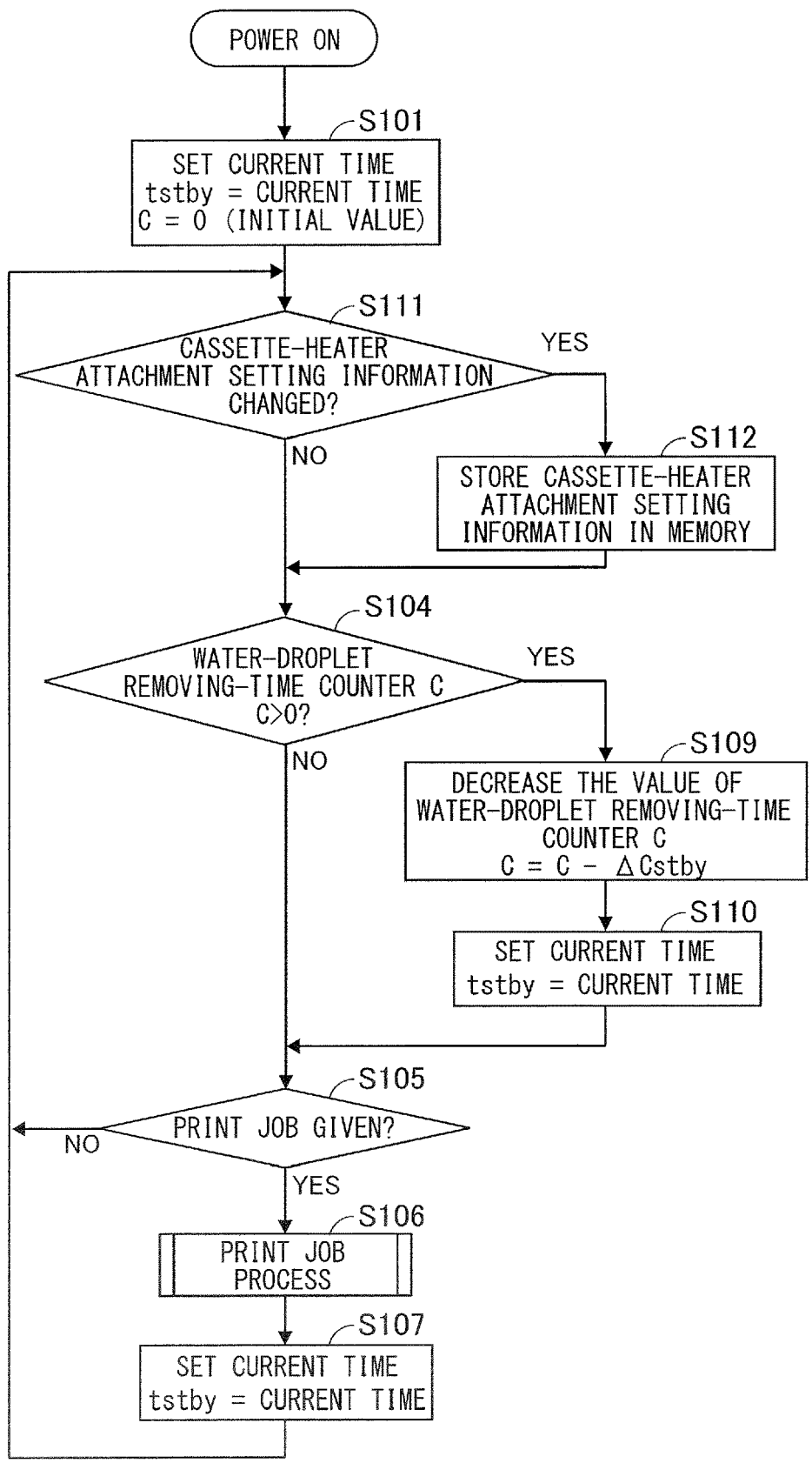
FIG. 13 is a flowchart illustrating a control flow of processes performed from when a power source of an image forming apparatus of the second embodiment is turned on, until when a print job process is performed.
Figure 14:
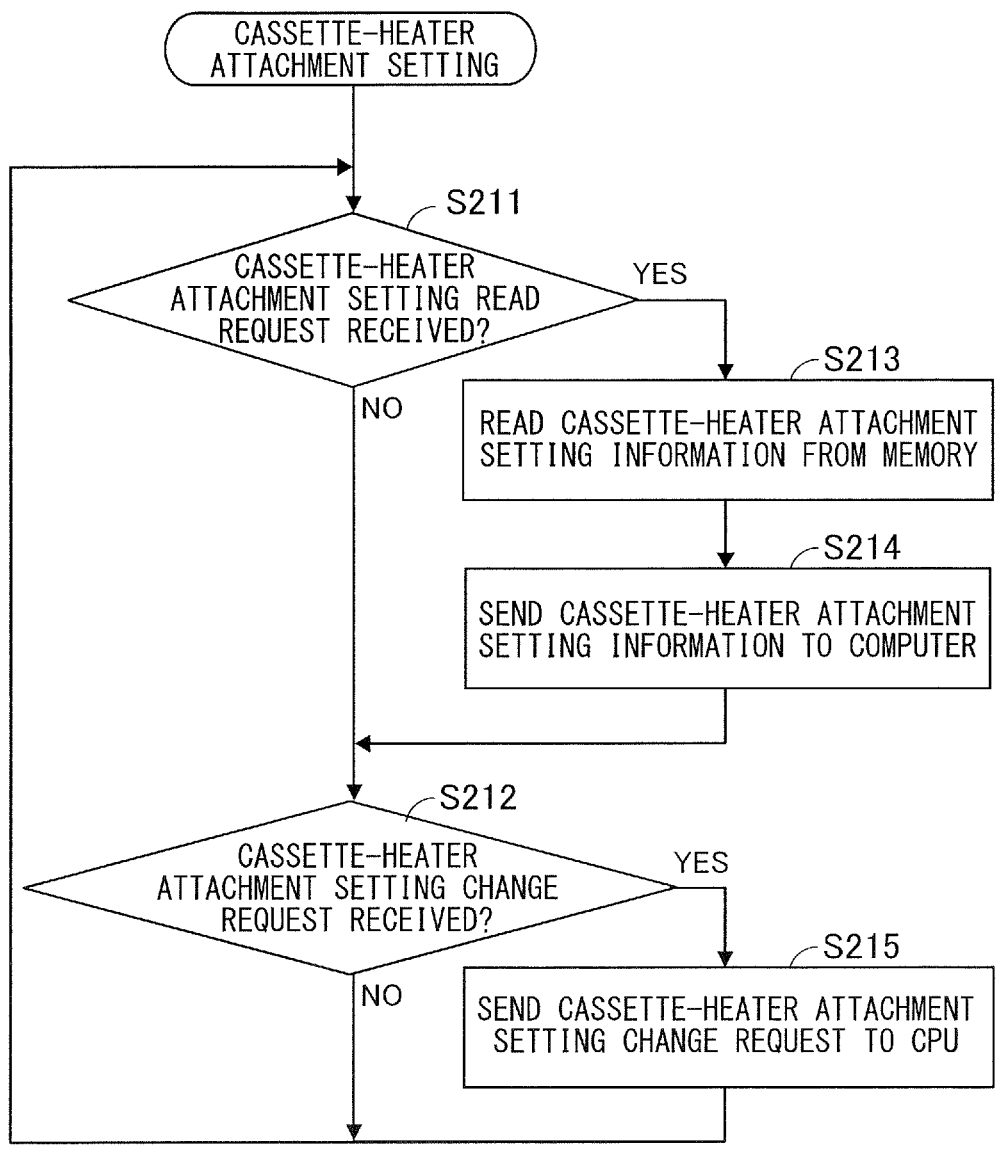
FIG. 14 is a flowchart of a cassette-heater attachment setting process of the second embodiment.

FIG. 13 illustrates a standby operation performed from when the power supply is turned on until when a job is given. When the power supply of the image forming apparatus 100 is turned on, the CPU 301 of the control unit 300 sets a current time to a variable tstby that holds a time used for measuring a natural-drying time taken in the standby operation (S101). In this time, the CPU 301 set an initial value (0 in the specific example) to the water-droplet removing-time counter C. Then the CPU 301 checks whether the setting of the attachment of the cassette heaters 140*a* and 140*b* to the respective feeding cassettes is changed (S111). The setting can be performed on the computer 283 connected to the control unit 300 via the external IF 282 of the image forming apparatus 100.

If the setting of the attachment of the cassette heaters 140*a* and 140*b* is changed in Step S111 (S111: YES), then the CPU 301 stores the setting information in the RAM 303 of the image forming apparatus 100 (S112). The data stored in the RAM 303 is illustrated in FIG. 10, for example. If the setting of the attachment is not changed in Step S111 (S111: NO), or after the CPU 301 stores the setting information in the RAM 303 in Step S112, the CPU 301 determines whether the value of the water-droplet removing-time counter C is larger than 0 (S104). The steps S101, S104, S105 to S107, S109, and S110 are the same as those illustrated in FIG. 6 and described above.

Next, a cassette-heater attachment setting flow performed by using the computer 283 connected to the image forming apparatus 100 via the external IF 282 will be described with reference to the flowchart of FIG. 14. When the cassette-heater attachment setting is performed by using the computer 283 connected to the image forming apparatus 100 via the external IF 282, a screen as illustrated in FIG. 12 is displayed on the computer 283. The cassette-heater attachment setting can be performed by pressing a cassette-heater attachment setting button 522 on the setting screen 521.

If the cassette-heater attachment setting button 522 is pressed on the setting screen 521, a cassette-heater-attachment-setting read request is sent from the computer 283 to the external IF 282. The external IF 282 checks the cassette-heater-attachment-setting read request (S211). Upon receiving the cassette-heater-attachment-setting read request (S211: YES), the external IF 282 reads the cassette-heater attachment setting information stored in the RAM 303 (S213). Then the CPU 301 sends the cassette-heater attachment setting information to the computer 283 (S214).

The computer 283 displays a current setting state on the display screen 520 in accordance with the cassette-heater attachment setting information sent in Step S214. For example, as illustrated in the data example of FIG. 10, if the cassette heater 140a is attached to the cassette 1 and the cassette heater 140b is attached to the cassette 2, a presence button displayed for the cassette 1 is selected for indicating the cassette heater attachment state of the cassette heater 140a, and a presence button displayed for the cassette 2 is selected for indicating the cassette heater attachment state of the cassette heater 140b. On the other hand, if a cassette heater is not attached to a corresponding cassette, a corresponding absence button is selected.

In addition, an operator can change the cassette-heater attachment setting on this screen. The operator presses a presence button 531 if a cassette heater is attached to a corresponding feeding cassette, or presses an absence button 532 if the cassette heater is not attached to the feeding cassette. The operator presses an OK button 534 on this screen when completing the setting, or presses a cancel button 533 on this screen when canceling the setting.

Thus, in the present embodiment, the image forming apparatus 100 includes the external IF 282 that can be connected with the computer 283 for inputting the information from the computer 283 into the image forming apparatus 100. Thus, as in the first embodiment, even though a mechanism to detect the attachment of the cassette heaters is not provided, the attachment of the cassette heaters can be detected with a low-cost configuration.

Thus, in the present embodiment, the image forming apparatus 100 includes the external IF 282 that can be connected with the computer 283 for inputting the information from the computer 283 into the image forming apparatus 100. Thus, as in the first embodiment, even though a mechanism to detect the attachment of the cassette heaters is not provided, the attachment of the cassette heaters can be detected with a low-cost configuration.

In addition, in the present embodiment, since the cassette-heater attachment setting can be performed by using an external terminal such as a computer connected to the CPU 301 via the external IF 282, the efficiency of the cassette-heater attachment setting operation can be increased in a configuration in which a plurality of image forming apparatuses is installed. Note that in the present embodiment, the image forming apparatus 100 may not have the operation unit 330 described in the first embodiment.

Third Embodiment

Next, a third embodiment will be described with reference to FIGS. 1 and 2, and FIGS. 15 and 16. In the above-described first embodiment, the standby time by which the feeding of a sheet is stopped in the water-droplet removing control performed when a cassette heater is attached to a corresponding sheet feeding cassette is made shorter than the standby time in the water-droplet removing control performed when the cassette heater is not attached to the feeding cassette. In the present embodiment, when a cassette heater is attached to a corresponding sheet feeding cassette, the water-droplet removing control is not performed. Since the other configuration and operations are the same as those of the first embodiment, a component identical to a component of the first embodiment is given an identical symbol, duplicated description and illustration will be omitted or simplified, and features different from the first embodiment will be mainly described below.

A print job process and water-droplet removing control of the present embodiment will be described with reference to FIGS. 15 and 16. The operations including the water-droplet removing control and performed from when the power supply of the image forming apparatus 100 is turned on until when an image forming job (a print job in this specific example) is completed and the cassette-heater attachment setting process are the same as those illustrated in FIGS. 6 and 7 of the first embodiment.

First, the print job process will be described with reference to the flowchart of FIG. 15. When a print job is given in Step S105 of FIG. 6, the CPU 301 reads the attachment setting information on the cassette heaters 140a and 140b from the RAM 303 (S321). Then the CPU 301 determines whether to feed a sheet from a feeding cassette to which a cassette heater is attached (S322). When a sheet is fed from a feeding cassette to which a cassette heater is not attached (S322: NO), the sheet may have moisture and cause steam in the fixing apparatus 170. Thus, the CPU 301 proceeds to Step S301, and performs the water-droplet removing control if conditions of each process are satisfied. The steps S301 to S312 are the same as those of FIG. 8 of the first embodiment.

On the other hand, when a sheet is fed from the feeding cassette to which the cassette heater is attached (S322: YES), the amount of steam generated in the fixing apparatus 170 does not cause water droplets because the sheet fed from the feeding cassette does not have moisture. Thus, the CPU 301 proceeds to Step S310, and starts to feed the sheet and form an image on the sheet without performing the water-droplet removing control. That is, if a cassette heater is attached to a sheet feeding cassette, the CPU 301 performs the normal mode regardless of the detection result by the environment sensor 119.

Next, the water-droplet removing control will be described with reference to the flowchart of FIG. 16. If the dew condensation environment flag has the on-value in Step S308 of FIG. 15 (S308: YES), then the CPU 301 sets a current time to the variable tprint, which is used to measure a natural-drying time taken in the print job (S401). Then the CPU 301 determines whether the double-side image forming mode is being performed (S402). The steps S401, S402, and S406 to S415 are the same as those of FIG. 9 of the first embodiment.

If the double-side image forming mode is not being performed in Step S402, that is, if the single-side image forming mode is being performed (S402: NO), the CPU 301 decreases the value of the water-droplet removing-time counter C (S406), and sets a current time to the variable tprint (S407). That is, in the present embodiment, since the processes of the flowchart of FIG. 16 are performed when a cassette heater is not attached to a sheet feeding cassette in Step S322 of FIG. 15 (S322: NO), the fed sheet may have moisture and cause steam in the fixing apparatus 170. However, since some of the water droplets evaporate in natural drying in the print operation, the CPU 301 decreases the value of the water-droplet removing-time counter C.

If the CPU 301 determines in Step S402 that the double-side image forming mode is being performed (S402: YES), then the CPU 301 determines whether the value of the water-droplet removing-time counter C is equal to or larger than the predetermined threshold C0 (S408). When the value of the water-droplet removing-time counter C is equal to or larger than the threshold C0 (S408: YES), water droplets highly likely have adhered to the duplex conveyance path 143. Thus, the CPU 301 executes Step S409 and steps that follow Step S409. That is, the CPU 301 increases the amount of air from the discharging fan 117, more than in the normal mode (S409), increases the set temperature of the fixing apparatus 170 (S410), and increases the standby time by which the feeding of a sheet is stopped (S411). In other words, when not performing the water-droplet removing control, the CPU 301 decreases the amount of air from the discharging fan 117 (S413), decreases the set temperature of the fixing apparatus 170 (S414), and decreases the standby time by which the feeding of a sheet is stopped, compared to a case where the water-droplet removing control is performed.

In addition, in the present embodiment, even though a cassette heater is not attached to a corresponding sheet feeding cassette, the CPU 301 of the control unit 300 does not perform the water-droplet removing control if the detection result by the environment sensor 119 satisfies the predetermined conditions. That is, the predetermined conditions are satisfied in Step S304 of FIG. 15 when the environmental temperature Tenv is larger than 10.0° C. and the absolute moisture content Wab is smaller than 5.5 g/m³. In this case, the control unit 300 does not perform the water-droplet removing control (S305, and S308: NO).

On the other hand, if a cassette heater is not attached to a corresponding sheet feeding cassette (S322: NO) and the detection result by the environment sensor 119 does not satisfy the predetermined conditions (S304: YES), the CPU 301 performs the water-droplet removing control. That is, if the detection result by the environment sensor 119 does not satisfy the predetermined conditions (S304: YES), the CPU 301 proceeds to Step S306, and the dew condensation environment flag has the on-value. Thus, the CPU 301 determines that the dew condensation environment flag has the on-value (S308: YES), and performs the water-droplet removing control in Step S309.

As described above, in the present embodiment, when the image forming portion 120 forms an image on a sheet, the control unit 300 can perform the dew condensation removing mode or the dew condensation removing mode. In the dew condensation removing mode, the control unit 300 adjusts the standby time by which the feeding of a sheet from a sheet feeding cassette is stopped. In the present embodiment, the water-droplet removing control is performed such that the standby time is made longer than that in a mode (normal mode) in which the water-droplet removing control is not performed. In addition, when one of the cassette heaters 140a and 140b is attached to a corresponding sheet feeding cassette, the control unit 300 does not perform the water-droplet removing control (that is, performs the normal mode).

Figure 15:
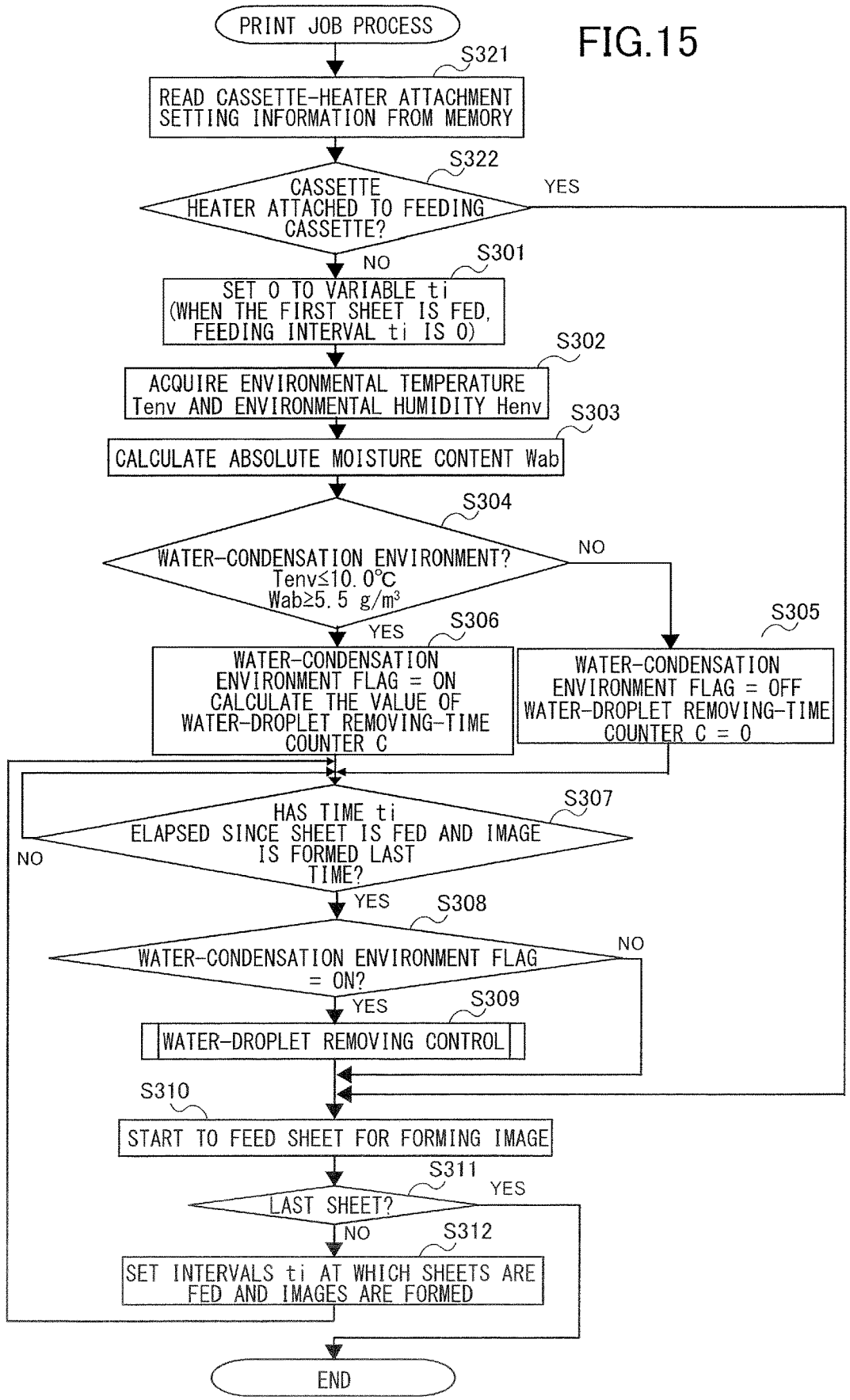
FIG. 15 is a flowchart of a print job process of a third embodiment.
Figure 16:
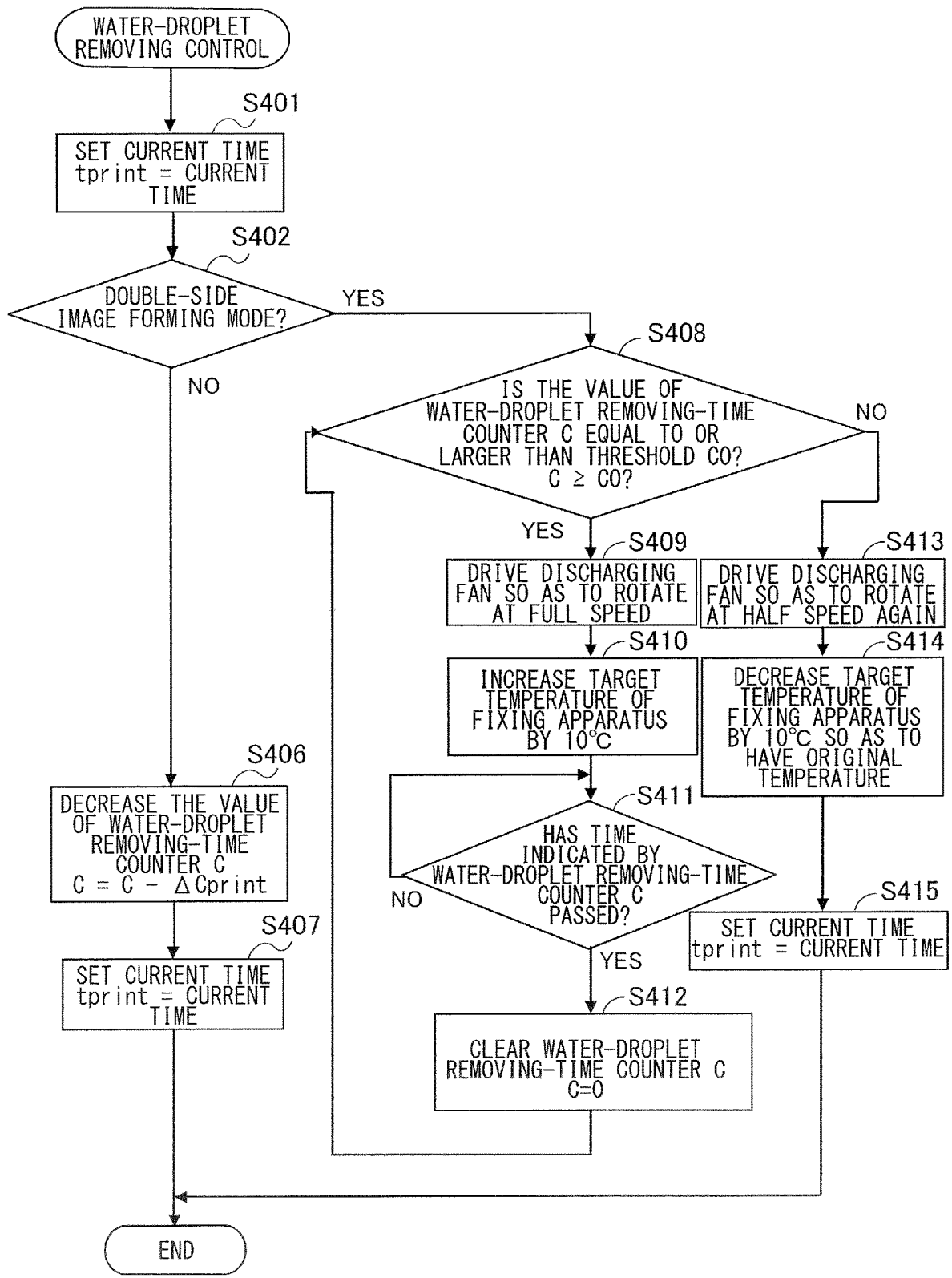
FIG. 16 is a flowchart of a water-droplet removing control of the third embodiment.

That is, if a cassette heater is attached to a corresponding sheet feeding cassette in Step S322 of FIG. 15 (S322: YES), then the CPU 301 proceeds to Step S310 and starts to feed a sheet without performing the water-droplet removing control of Step S309.

Thus, in the present embodiment, if a cassette heater is attached to a sheet feeding cassette, the CPU 301 does not perform the water-droplet removing control. Thus, the control performed by the apparatus can be simplified. Specifically, if a cassette heater is attached to a sheet feeding cassette, the sheets stored in the sheet feeding cassette highly likely have been heated for a long time, hardly producing water droplets. Thus, the control performed by the apparatus can be simplified because the CPU 301 does not constantly perform the water-droplet removing control.

In addition, the second embodiment may be applied in the present embodiment. Specifically, the cassette heater attachment setting may be performed by using the computer 283 as illustrated in FIG. 12, and the processes of the flowcharts of FIGS. 13 and 14 may be performed instead of the processes of the flowcharts of FIGS. 6 and 7 of the first embodiment.

Other Embodiments

In the above-described embodiments, the water-droplet removing control is the combination of the control that increases the standby time by which the feeding of a sheet is stopped, the control that switches the speed of the discharging fan 117 to the full speed, and the control that increases the target temperature of the fixing apparatus 170. However, even if each control is performed without being combined, or even if another control is performed, the same effects are produced by determining whether a cassette heater is attached to a feeding cassette.

In addition, in the above-described embodiments, each cassette heater is supplied with electric power from a power source different from that of the apparatus body. However, the cassettes may be supplied with electric power from the apparatus body. In addition, although the attachment of the cassette heaters is detected, in the above-described embodiments, by a user setting the attachment of the cassette heaters through the operation unit 330 or the computer 283, the attachment of the cassette heaters may be electrically or mechanically detected by a certain mechanism. For example, the cassette heaters and the control unit may be connected with each other via a signal line, and the control unit may detect the attachment of the cassette heaters. In another case, a switch may be provided for detecting the attachment of each cassette heater, and the control unit may determine the attachment of the cassette heaters depending on an on-state or an off-state of the switch. The switch may be operated by an operator when a cassette heater is attached or detached, or may be disposed in a feeding cassette or the apparatus body and turned on or off when a corresponding cassette heater is attached or detached.

In addition, in the above-described embodiments, the standby time is increased by the water-droplet removing control when the double-side image forming mode is performed. However, such control may be applied for the single-side image forming mode. Also in the single-side image forming mode, the steam from a sheet heated by the fixing apparatus may produce water droplets on the conveyance path of the sheet. For example, in a case where a plurality of discharging paths are formed for discharging a sheet, if a plurality of sheets pass through the fixing apparatus and are discharged to the outside of the apparatus through one discharging path, and then another sheet is discharged to the outside of the apparatus through another discharging path, the plurality of sheets discharged through the one discharging path does not pass through the other discharging path. Thus, if the plurality of sheets is fed from a feeding cassette to which a cassette heater is not attached, the steam generated when the plurality of sheets pass through the fixing apparatus may produce water droplets on the other discharging path. Thus, in this case, the standby time by which the feeding of a sheet is stopped in a case where a cassette heater is not attached to a corresponding sheet feeding cassette may be made longer than the standby by which the feeding of a sheet is stopped in a case where a cassette heater is attached to a corresponding feeding cassette.

In addition, although the description has been made for the configuration in which a plurality of feeding cassettes are disposed as storage portions in the above-described embodiments, the present invention is also applicable for a configuration in which only one feeding cassette is disposed in the image forming apparatus and a cassette heater is detachably attached to the feeding cassette.

In the above-described embodiments, the water-droplet removing control (dew condensation removing mode) is performed in the double-side image forming mode performed after the single-side image forming mode is continuously performed on a predetermined number of sheets. However, the dew condensation removing mode may be performed whenever dew condensation is easily caused in the interior of the image forming apparatus. For example, the water-droplet removing control may be performed in the double-side image forming mode performed after the single-side image forming mode is performed on at least one sheet. In another case, the water-droplet removing control may be performed in the double-side image forming mode performed after the single-side image forming mode is continuously performed on a predetermined number of sheets (e.g. two or more sheets).

As described above, water droplets easily adhere to a sheet in the double-side image forming mode performed after the single-side image forming mode. Thus, even in such a configuration, since the above-described standby time is made longer in the double-side image forming mode, than in the normal mode, the apparatus hardly causes the failure in conveyance of sheets and image defects. With the configuration, the apparatus can be made inexpensive.

In addition, a predicted temperature of the interior of the image forming apparatus may be corrected using information on cassette heaters (the number of attached cassette heaters and attachment position) inputted by an operator via the operation unit 330 or the external IF 282. For example, if a cassette heater is attached to a feeding cassette, the predicted temperature of the interior of the apparatus may be corrected so as to have a value higher than that of the predicted temperature obtained when the cassette heater is not attached to the feeding cassette. In another case, if more cassette heaters (for example, a plurality of cassette heaters) are attached to feeding cassettes, the predicted temperature of the interior of the apparatus may be corrected so as to have a value higher than that of the predicted temperature obtained when less cassette heaters (for example, one) are attached to feeding cassettes. In another case, if a cassette heater is attached to a feeding cassette located closer to the image forming portion 120, the predicted temperature of the interior of the apparatus may be corrected so as to have a value higher than that of the predicted temperature obtained in a case where a cassette heater is attached to only one feeding cassette disposed below the position of the above-described feeding cassette, disposed closer to the image forming portion 120, in the vertical direction. In the example of FIG. 1, the predicted temperature of the interior of the apparatus obtained when a cassette heater is attached to only the upper feeding cassette 111a may be corrected so as to have a value higher than that of the predicted temperature obtained when a cassette heater is attached to only the lower feeding cassette 111b. By using a temperature predicted in such a manner, the control unit 300 controls the fan to take the air into the apparatus body or discharge the air from the apparatus body, and stops or restarts an image forming operation.

In addition, a temperature in the vicinity of the development unit predicted in accordance with a detection result detected by the environment sensor 119 or another sensor may be corrected using information on cassette heaters (the number of attached cassette heaters and attachment position) inputted by an operator via the operation unit 330 or the external IF 282. For example, if a cassette heater is attached to a feeding cassette, the predicted temperature may be corrected so as to have a value higher than the predicted temperature obtained when the cassette heater is not attached to the feeding cassette. In another case, if a cassette heater is attached to a feeding cassette located closer to the development unit, the predicted temperature may be corrected so as to have a value higher than that of the predicted temperature obtained in a case where a cassette heater is attached to only one feeding cassette disposed below the position of the above-described feeding cassette, disposed closer to the development unit, in the vertical direction. In the example of FIG. 1, the predicted temperature of the interior of the apparatus obtained when a cassette heater is attached to only the upper feeding cassette 111a may be corrected so as to have a value higher than that of the predicted temperature obtained when a cassette heater is attached to only the lower feeding cassette 111b. By using a temperature predicted in such a manner, the control unit 300 controls the fan to take the air into the apparatus body or discharge the air from the apparatus body, and stops or restarts an image forming operation.

The present invention can prevent the failure in conveyance of sheets and the deterioration in image quality caused by the adhesion of water droplets to a sheet, while preventing the reduction in productivity of the apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072969, filed Apr. 5, 2019, which is hereby incorporated by reference herein in its entirety.

What is claimed is:
1. An image forming apparatus comprising:
an image forming unit configured to form an image on a sheet;

a storage portion which is configured to store a sheet, and to which a heating unit configured to heat the sheet stored in the storage portion is detachably attached;

a conveyance unit configured to convey the sheet stored in the storage portion to the image forming unit;

a detection unit configured to detect attachment of the heating unit to the storage portion; and a control unit configured to control the conveyance unit such that a standby time by which conveyance of the sheet fed from the storage portion is stopped is shorter when the detection unit detects the heating unit than when the detection unit does not detect the heating unit.

2. The image forming apparatus according to claim 1, wherein the conveyance unit comprises a feeding portion configured to feed the sheet stored in the storage portion toward the image forming unit, and wherein when the detection unit detects the heating unit, the control unit reduces the standby time by making a start time of sheet feeding performed by the feeding portion, earlier than a start time of sheet feeding performed when the detection unit does not detect the heating unit.

3. The image forming apparatus according to claim 1, wherein the conveyance unit comprises a feeding portion configured to feed the sheet stored in the storage portion toward the image forming unit, and a conveyance portion configured to temporarily stop the sheet fed by the feeding portion and then convey the sheet to the image forming unit, and wherein when the detection unit detects the heating unit, the control unit reduces the standby time by making a temporary-stop time of sheet conveyance performed by the conveyance portion, shorter than a temporary-stop time of sheet conveyance performed when the detection unit does not detect the heating unit.

4. The image forming apparatus according to claim 1, further comprising an environment sensor configured to detect a temperature and a humidity of an interior of the image forming apparatus, wherein the control unit performs a normal mode if a detection result by the environment sensor satisfies a predetermined condition, or performs a dew condensation removing mode if the detection result by the environment sensor does not satisfy the predetermined condition, wherein the standby time in the dew condensation removing mode is longer than the standby time in the normal mode, and wherein in the dew condensation removing mode, when the detection unit detects the heating unit, the control unit controls the conveyance unit such that the standby time is made shorter than the standby time used when the detection unit does not detect the heating unit.

5. The image forming apparatus according to claim 1, further comprising an environment sensor configured to detect a temperature and a humidity of an interior of the image forming apparatus, wherein the control unit performs a normal mode if a detection result by the environment sensor satisfies a predetermined condition, or performs a dew condensation removing mode if the detection result by the environment sensor does not satisfy the predetermined condition, wherein the standby time in the dew condensation removing mode is longer than the standby time in the normal mode, and wherein when the detection unit detects the heating unit, the control unit performs the normal mode regardless of the detection result by the environment sensor.

6. The image forming apparatus according to claim 4, wherein the image forming unit comprises:

an image bearing member configured to bear a toner image;

a transfer portion configured to transfer the toner image from the image bearing member onto a sheet; and a fixing portion configured to fix the toner image to the sheet by heating the sheet to which the toner image has been transferred, and wherein in a state where conveyance of a sheet is stopped in the dew condensation removing mode, when the detection unit detects the heating unit, the control unit makes a set temperature of the fixing portion lower than a set temperature of the fixing portion used when the detection unit does not detect the heating unit.

7. The image forming apparatus according to claim 4, wherein the image forming portion comprises:

an image bearing member configured to bear a toner image;

a transfer portion configured to transfer the toner image from the image bearing member onto a sheet;

a fixing portion configured to fix the toner image to the sheet by heating the sheet to which the toner image has been transferred; and a reverse-and-conveyance portion configured to reverse a sheet having passed through the fixing portion and convey the sheet to the transfer portion again, wherein the control unit is configured to perform the dew condensation removing mode in a double-side image forming mode in which toner images are formed on both sides of a sheet, and wherein when the detection unit detects the heating unit in the dew condensation removing mode, the control unit makes the standby time by which feeding of a sheet for forming an image on a first side is stopped, shorter than the standby time used when the detection unit does not detect the heating unit.

8. The image forming apparatus according to claim 7, wherein in a state where conveyance of a sheet is stopped in the dew condensation removing mode, when the detection unit detects the heating unit, the control unit makes a set temperature of the fixing portion lower than a set temperature of the fixing portion used when the detection unit does not detect the heating unit.

9. The image forming apparatus according to claim 4, further comprising a discharging fan configured to discharge air of an interior of the image forming apparatus to an outside, wherein in a state where conveyance of a sheet is stopped in the dew condensation removing mode, when the detection unit detects the heating unit, the control unit makes a volume of air from the discharging fan, smaller than a volume of air from the discharging fan measured when the detection unit does not detect the heating unit.

10. The image forming apparatus according to claim 1, wherein the detection unit is an operation unit disposed on the image forming apparatus and configured to operate the image forming apparatus, and is configured to detect attachment of the heating unit when receiving information on the attachment of the heating unit to the storage portion from the operation unit.

11. The image forming apparatus according to claim 1, wherein the detection unit is a connection portion configured to be connected with an external terminal that sends information to the image forming apparatus, and is configured to detect attachment of the heating unit when receiving information on the attachment of the heating unit to the storage portion from the external terminal.

* * * * *